United States Patent
Cheung

(10) Patent No.: US 12,361,661 B1
(45) Date of Patent: Jul. 15, 2025

(54) ARTIFICIAL REALITY (XR) LOCATION-BASED DISPLAYS AND INTERACTIONS

(71) Applicant: Meta Platforms Technologies, LLC, Menlo Park, CA (US)

(72) Inventor: Vincent Charles Cheung, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 214 days.

(21) Appl. No.: 18/069,644

(22) Filed: Dec. 21, 2022

(51) Int. Cl.
| | |
|---|---|
| G06T 19/00 | (2011.01) |
| G06F 3/04847 | (2022.01) |
| G06T 7/20 | (2017.01) |
| G06T 19/20 | (2011.01) |
| G06V 10/74 | (2022.01) |

(52) U.S. Cl.
CPC .......... G06T 19/20 (2013.01); G06F 3/04847 (2013.01); G06T 7/20 (2013.01); G06V 10/761 (2022.01); *G06T 2219/2004* (2013.01)

(58) Field of Classification Search
CPC ....... G06T 19/006; G06T 19/20; G06T 19/00; G06T 17/00; G06T 17/05; G06T 2200/24; G06F 16/54; G06F 3/011; G06F 3/04815; G06F 3/04812; G06V 20/02
See application file for complete search history.

(56) References Cited

U.S. PATENT DOCUMENTS

| | | |
|---|---|---|
| 5,065,436 A | 11/1991 | Matsumura |
| 5,787,487 A | 7/1998 | Hashimoto et al. |
| 7,324,844 B1 | 1/2008 | Levine et al. |
| 8,128,500 B1 | 3/2012 | Borst et al. |
| 9,129,430 B2 | 9/2015 | Salter et al. |
| 9,395,883 B1 | 7/2016 | Olsson et al. |
| 9,495,783 B1 | 11/2016 | Samarasekera et al. |
| 9,781,342 B1 | 10/2017 | Turley et al. |
| 9,898,863 B2 | 2/2018 | Miyazaya et al. |
| 9,959,905 B1 | 5/2018 | Sevigny |
| 10,148,875 B1 | 12/2018 | Chen |
| 10,304,200 B2 | 5/2019 | Menozzi |
| 10,410,441 B2 | 9/2019 | Jordan et al. |
| 10,482,659 B2 | 11/2019 | Li et al. |

(Continued)

OTHER PUBLICATIONS

Advisory Action mailed Sep. 29, 2021 for U.S. Appl. No. 16/710,738, filed Dec. 11, 2019, 3 pages.

(Continued)

*Primary Examiner* — Hau H Nguyen

(74) *Attorney, Agent, or Firm* — Potomac Law Group, PLLC; Dannon G. Allbee

(57) ABSTRACT

A computer implemented method for location-based interaction in an artificial reality (XR) environment comprises determining an indication of a location. A historical state of the location is retrieved in the XR environment. One or more inputs specifying a command related to the historical state of the location, are received on an XR device. The command indicates either to retrieve information of virtual entities that previously existed at the location or to undo a modification of one or more features at the location. One or more virtual entities are matched to the location in the XR environment for a given timeframe and an indication of the matched one or more virtual entities, is displayed.

20 Claims, 13 Drawing Sheets

(56) References Cited

U.S. PATENT DOCUMENTS

| | | | |
|---|---|---|---|
| 10,491,819 B2 | 11/2019 | Corcoran | |
| 10,535,199 B1 | 1/2020 | Bond et al. | |
| 10,551,050 B1 | 2/2020 | Park et al. | |
| 10,580,218 B1 | 3/2020 | Viner | |
| 10,602,300 B1 | 3/2020 | Lyren | |
| 10,602,302 B1 | 3/2020 | Lyren | |
| 10,645,293 B1 | 5/2020 | Cabral et al. | |
| 10,762,878 B1 | 9/2020 | Gomez Diaz et al. | |
| 10,776,993 B1 | 9/2020 | Chen et al. | |
| 10,848,738 B1 | 11/2020 | Petrangeli et al. | |
| 10,861,422 B1 | 12/2020 | Seiler et al. | |
| 10,877,622 B2 | 12/2020 | Romano et al. | |
| 10,922,850 B1 | 2/2021 | Harrison et al. | |
| 11,048,760 B1 | 6/2021 | Bhushan et al. | |
| 11,087,558 B1 * | 8/2021 | Kuhn | G02B 27/0172 |
| 11,138,803 B1 | 10/2021 | Abdel-Wahab et al. | |
| 11,159,634 B1 | 10/2021 | Deshpande et al. | |
| 11,531,402 B1 | 12/2022 | Stolzenberg | |
| 11,615,579 B1 | 3/2023 | Thivierge | |
| 11,816,757 B1 | 11/2023 | Summers et al. | |
| 2001/0056574 A1 | 12/2001 | Richards | |
| 2002/0180725 A1 | 12/2002 | Simmonds et al. | |
| 2004/0240393 A1 | 12/2004 | Nishida et al. | |
| 2010/0257187 A1 | 10/2010 | Fontijn et al. | |
| 2012/0062702 A1 | 3/2012 | Jiang et al. | |
| 2012/0075343 A1 | 3/2012 | Chen et al. | |
| 2012/0206452 A1 | 8/2012 | Geisner et al. | |
| 2013/0063487 A1 | 3/2013 | Spiegel et al. | |
| 2013/0083011 A1 | 4/2013 | Geisner et al. | |
| 2014/0043365 A1 | 2/2014 | Fialho et al. | |
| 2014/0067869 A1 | 3/2014 | Fateh et al. | |
| 2014/0192085 A1 | 7/2014 | Kim | |
| 2014/0192087 A1 | 7/2014 | Frost | |
| 2014/0267403 A1 | 9/2014 | Maciocci et al. | |
| 2014/0364209 A1 | 12/2014 | Perry | |
| 2014/0375683 A1 | 12/2014 | Salter et al. | |
| 2015/0046296 A1 | 2/2015 | Hart | |
| 2015/0109336 A1 | 4/2015 | Hayakawa et al. | |
| 2015/0109481 A1 | 4/2015 | Hayakawa | |
| 2015/0153571 A1 | 6/2015 | Ballard et al. | |
| 2016/0026242 A1 | 1/2016 | Burns et al. | |
| 2016/0035140 A1 | 2/2016 | Bickerstaff et al. | |
| 2016/0048725 A1 | 2/2016 | Holz et al. | |
| 2016/0110921 A1 | 4/2016 | Takahashi et al. | |
| 2016/0127710 A1 | 5/2016 | Saban et al. | |
| 2016/0171773 A1 | 6/2016 | Hara | |
| 2016/0216518 A1 | 7/2016 | Raghoebardajal et al. | |
| 2016/0225072 A1 | 8/2016 | Brady et al. | |
| 2016/0253841 A1 | 9/2016 | Ur et al. | |
| 2016/0262608 A1 | 9/2016 | Krueger | |
| 2016/0300388 A1 | 10/2016 | Stafford et al. | |
| 2016/0306431 A1 | 10/2016 | Stafford et al. | |
| 2016/0313734 A1 | 10/2016 | Enke | |
| 2016/0321841 A1 | 11/2016 | Christen et al. | |
| 2016/0337630 A1 | 11/2016 | Raghoebardajal et al. | |
| 2016/0343107 A1 | 11/2016 | Newman et al. | |
| 2017/0052595 A1 | 2/2017 | Poulos et al. | |
| 2017/0053545 A1 | 2/2017 | Yang et al. | |
| 2017/0075942 A1 | 3/2017 | Childs et al. | |
| 2017/0076425 A1 | 3/2017 | Folse | |
| 2017/0108918 A1 | 4/2017 | Boesen | |
| 2017/0151484 A1 | 6/2017 | Reilly et al. | |
| 2017/0237789 A1 | 8/2017 | Harner et al. | |
| 2017/0270562 A1 | 9/2017 | Ben-Rubi et al. | |
| 2017/0278486 A1 | 9/2017 | Ishikawa et al. | |
| 2017/0289219 A1 | 10/2017 | Khalid et al. | |
| 2017/0295446 A1 | 10/2017 | Thagadur Shivappa | |
| 2017/0309079 A1 | 10/2017 | Naples et al. | |
| 2017/0323449 A1 | 11/2017 | Aonuma et al. | |
| 2017/0353410 A1 | 12/2017 | Gonzales | |
| 2017/0354502 A1 | 12/2017 | Ryu | |
| 2018/0032130 A1 | 2/2018 | Meglan | |
| 2018/0116601 A1 | 5/2018 | Yi et al. | |
| 2018/0124497 A1 | 5/2018 | Boesen | |
| 2018/0160108 A1 | 6/2018 | Park et al. | |
| 2018/0160123 A1 | 6/2018 | Van Der Auwera et al. | |
| 2018/0182172 A1 | 6/2018 | Vinmani et al. | |
| 2018/0183696 A1 | 6/2018 | Chang et al. | |
| 2018/0197624 A1 | 7/2018 | Robaina et al. | |
| 2018/0199029 A1 | 7/2018 | Van Der Auwera et al. | |
| 2018/0213359 A1 | 7/2018 | Reinhardt et al. | |
| 2018/0232952 A1 | 8/2018 | Hiranandani et al. | |
| 2018/0249086 A1 | 8/2018 | Ozawa et al. | |
| 2018/0253900 A1 | 9/2018 | Finding et al. | |
| 2018/0268219 A1 | 9/2018 | Miller et al. | |
| 2018/0268517 A1 | 9/2018 | Coban et al. | |
| 2018/0276789 A1 | 9/2018 | Van Der Auwera et al. | |
| 2018/0276826 A1 | 9/2018 | Van Der Auwera et al. | |
| 2018/0284453 A1 | 10/2018 | Irvin et al. | |
| 2018/0284885 A1 | 10/2018 | Kim | |
| 2018/0293169 A1 | 10/2018 | Beard et al. | |
| 2018/0307303 A1 | 10/2018 | Powderly et al. | |
| 2018/0308287 A1 | 10/2018 | Daniels et al. | |
| 2018/0315243 A1 | 11/2018 | Mahler et al. | |
| 2018/0324404 A1 | 11/2018 | Sevigny | |
| 2018/0329209 A1 | 11/2018 | Nattukallingal | |
| 2018/0329482 A1 | 11/2018 | Woo et al. | |
| 2018/0332219 A1 | 11/2018 | Corcoran | |
| 2018/0341323 A1 | 11/2018 | Mate et al. | |
| 2018/0350103 A1 | 12/2018 | Skidmore et al. | |
| 2018/0350150 A1 | 12/2018 | Powderly et al. | |
| 2018/0357749 A1 | 12/2018 | Young et al. | |
| 2018/0357752 A1 | 12/2018 | Ho et al. | |
| 2018/0361240 A1 | 12/2018 | Ikenoue et al. | |
| 2018/0373325 A1 | 12/2018 | Rosso et al. | |
| 2018/0376076 A1 | 12/2018 | Park et al. | |
| 2019/0005724 A1 | 1/2019 | Pahud et al. | |
| 2019/0012838 A1 | 1/2019 | Uchida | |
| 2019/0012839 A1 | 1/2019 | Wang | |
| 2019/0019378 A1 | 1/2019 | Greiner et al. | |
| 2019/0028722 A1 | 1/2019 | Choi et al. | |
| 2019/0041651 A1 | 2/2019 | Kiemele et al. | |
| 2019/0042834 A1 | 2/2019 | Gavino et al. | |
| 2019/0043167 A1 | 2/2019 | Steyskal et al. | |
| 2019/0043448 A1 | 2/2019 | Thakur et al. | |
| 2019/0073109 A1 | 3/2019 | Zhang et al. | |
| 2019/0102956 A1 | 4/2019 | Ishihara et al. | |
| 2019/0108578 A1 | 4/2019 | Spivack et al. | |
| 2019/0114061 A1 | 4/2019 | Daniels et al. | |
| 2019/0130622 A1 | 5/2019 | Hoover et al. | |
| 2019/0164334 A1 | 5/2019 | Denman et al. | |
| 2019/0188450 A1 | 6/2019 | Spivack et al. | |
| 2019/0196674 A1 | 6/2019 | Baig et al. | |
| 2019/0197786 A1 | 6/2019 | Molyneaux et al. | |
| 2019/0199993 A1 | 6/2019 | Babu J D et al. | |
| 2019/0214709 A1 | 7/2019 | Frishman et al. | |
| 2019/0215503 A1 | 7/2019 | Monson et al. | |
| 2019/0222776 A1 | 7/2019 | Carter et al. | |
| 2019/0230317 A1 | 7/2019 | Sheftel et al. | |
| 2019/0242952 A1 | 8/2019 | Schneider et al. | |
| 2019/0243530 A1 | 8/2019 | De Ridder et al. | |
| 2019/0244431 A1 | 8/2019 | Skidmore | |
| 2019/0272674 A1 | 9/2019 | Comer et al. | |
| 2019/0287080 A1 | 9/2019 | Penilla et al. | |
| 2019/0289341 A1 | 9/2019 | Vasco De Oliveira Redol | |
| 2019/0304139 A1 | 10/2019 | Joshi et al. | |
| 2019/0304190 A1 | 10/2019 | Johnson et al. | |
| 2019/0306490 A1 | 10/2019 | Li et al. | |
| 2019/0311341 A1 * | 10/2019 | Rice | G06F 3/011 |
| 2019/0311471 A1 | 10/2019 | Kurabayashi | |
| 2019/0318404 A1 | 10/2019 | LaMontagne | |
| 2019/0318539 A1 | 10/2019 | Weston | |
| 2019/0353904 A1 | 11/2019 | Ardovino | |
| 2019/0356849 A1 | 11/2019 | Sapienza et al. | |
| 2019/0362557 A1 | 11/2019 | Lacey et al. | |
| 2019/0369722 A1 | 12/2019 | Lehtiniemi et al. | |
| 2019/0369837 A1 | 12/2019 | Davis | |
| 2019/0370544 A1 | 12/2019 | Wright, Jr. et al. | |
| 2020/0004328 A1 | 1/2020 | Blume et al. | |
| 2020/0029006 A1 | 1/2020 | Levy et al. | |
| 2020/0035003 A1 | 1/2020 | Canberk et al. | |
| 2020/0035024 A1 | 1/2020 | Price et al. | |
| 2020/0037943 A1 | 2/2020 | Chaja et al. | |
| 2020/0058256 A1 | 2/2020 | Seibert et al. | |

(56) References Cited

U.S. PATENT DOCUMENTS

| | | |
|---|---|---|
| 2020/0066040 A1 | 2/2020 | Unnerstall et al. |
| 2020/0073531 A1 | 3/2020 | Romano et al. |
| 2020/0074181 A1 | 3/2020 | Chang et al. |
| 2020/0074738 A1 | 3/2020 | Hare et al. |
| 2020/0082548 A1 | 3/2020 | Graham et al. |
| 2020/0082600 A1 | 3/2020 | Jones et al. |
| 2020/0090407 A1 | 3/2020 | Miranda et al. |
| 2020/0111232 A1 | 4/2020 | Bleyer et al. |
| 2020/0111256 A1 | 4/2020 | Bleyer et al. |
| 2020/0125244 A1 | 4/2020 | Feinstein |
| 2020/0125322 A1 | 4/2020 | Wilde |
| 2020/0128348 A1 | 4/2020 | Eronen et al. |
| 2020/0133300 A1 | 4/2020 | Iyer et al. |
| 2020/0137290 A1 | 4/2020 | Lee et al. |
| 2020/0162712 A1 | 5/2020 | Yun |
| 2020/0162851 A1 | 5/2020 | Wilde |
| 2020/0168001 A1 | 5/2020 | Yang et al. |
| 2020/0174552 A1 | 6/2020 | Stafford et al. |
| 2020/0175768 A1 | 6/2020 | Lake et al. |
| 2020/0184934 A1 | 6/2020 | Choi et al. |
| 2020/0188792 A1 | 6/2020 | Stephens et al. |
| 2020/0193708 A1 | 6/2020 | Maggiore et al. |
| 2020/0193976 A1 | 6/2020 | Cartwright et al. |
| 2020/0201045 A1 | 6/2020 | Liu et al. |
| 2020/0221147 A1 | 7/2020 | Batra et al. |
| 2020/0226835 A1 | 7/2020 | Farchy et al. |
| 2020/0228774 A1 | 7/2020 | Kar et al. |
| 2020/0233453 A1 | 7/2020 | Hatfield et al. |
| 2020/0241291 A1 | 7/2020 | Walker |
| 2020/0241635 A1 | 7/2020 | Cohen |
| 2020/0242848 A1 | 7/2020 | Ambler et al. |
| 2020/0244875 A1 | 7/2020 | Lee et al. |
| 2020/0245032 A1 | 7/2020 | Murtaza et al. |
| 2020/0252532 A1 | 8/2020 | Shimokawa et al. |
| 2020/0252602 A1 | 8/2020 | Oonishi et al. |
| 2020/0267296 A1 | 8/2020 | Usui |
| 2020/0292823 A1 | 9/2020 | Niforatos et al. |
| 2020/0302682 A1 | 9/2020 | Aksoy et al. |
| 2020/0307437 A1 | 10/2020 | Thieberger et al. |
| 2020/0326831 A1 | 10/2020 | Marr |
| 2020/0329266 A1 | 10/2020 | Takaku |
| 2020/0357183 A1 | 11/2020 | Weber |
| 2020/0366836 A1 | 11/2020 | Hyaku et al. |
| 2020/0367970 A1 | 11/2020 | Qiu et al. |
| 2020/0372718 A1 | 11/2020 | Molyneaux et al. |
| 2020/0388178 A1 | 12/2020 | Barbuto et al. |
| 2020/0388246 A1 | 12/2020 | Chrapek et al. |
| 2020/0394843 A1 | 12/2020 | Ramachandra Iyer |
| 2020/0401217 A1 | 12/2020 | Matsuoka et al. |
| 2020/0404177 A1 | 12/2020 | Sapienza et al. |
| 2020/0404447 A1 | 12/2020 | Yerli |
| 2020/0410766 A1 | 12/2020 | Swaminathan |
| 2021/0012113 A1 | 1/2021 | Petill et al. |
| 2021/0019036 A1 | 1/2021 | Wang et al. |
| 2021/0043069 A1 | 2/2021 | De Vries et al. |
| 2021/0044747 A1 | 2/2021 | Panchagnula et al. |
| 2021/0049824 A1 | 2/2021 | Edwards |
| 2021/0055787 A1 | 2/2021 | Chhabra et al. |
| 2021/0065333 A1 | 3/2021 | Ogawa |
| 2021/0072940 A1 | 3/2021 | Kanzaki et al. |
| 2021/0102820 A1 | 4/2021 | Le et al. |
| 2021/0103449 A1 | 4/2021 | Terpstra et al. |
| 2021/0125295 A1 | 4/2021 | Kim et al. |
| 2021/0125417 A1 | 4/2021 | Ando |
| 2021/0125664 A1 | 4/2021 | Holland et al. |
| 2021/0133991 A1 | 5/2021 | Tamama et al. |
| 2021/0142509 A1 | 5/2021 | Zhang et al. |
| 2021/0142575 A1 | 5/2021 | Taylor et al. |
| 2021/0157312 A1 | 5/2021 | Cella et al. |
| 2021/0157390 A1 | 5/2021 | Yardi et al. |
| 2021/0176399 A1 | 6/2021 | Byon et al. |
| 2021/0195157 A1 | 6/2021 | Stokking et al. |
| 2021/0204087 A1 | 7/2021 | Lyren |
| 2021/0210125 A1 | 7/2021 | Song |
| 2021/0216773 A1 | 7/2021 | Bohannon et al. |
| 2021/0240985 A1 | 8/2021 | Phillips et al. |
| 2021/0320955 A1 | 10/2021 | Kolan |
| 2021/0327145 A1 | 10/2021 | Noorkami et al. |
| 2021/0373654 A1 | 12/2021 | Franci Rodon et al. |
| 2021/0397252 A1 | 12/2021 | Nakade et al. |
| 2021/0398360 A1 | 12/2021 | Drummond et al. |
| 2021/0407210 A1 | 12/2021 | Maggiore et al. |
| 2022/0028172 A1 | 1/2022 | Yip et al. |
| 2022/0101613 A1* | 3/2022 | Rockel ............... G06F 3/0304 |
| 2022/0165037 A1 | 5/2022 | Zavesky et al. |
| 2022/0207838 A1 | 6/2022 | Anvaripour et al. |
| 2022/0207869 A1 | 6/2022 | Goodrich |
| 2022/0229534 A1 | 7/2022 | Terre et al. |
| 2022/0310087 A1 | 9/2022 | Mukhi et al. |
| 2023/0089622 A1 | 3/2023 | Verma |
| 2023/0351711 A1* | 11/2023 | Roach ............... G06T 19/006 |

OTHER PUBLICATIONS

Final Office Action mailed Jul. 9, 2021 for U.S. Appl. No. 16/710,738, filed Dec. 11, 2019, 37 Pages.

Final Office Action mailed Apr. 28, 2022 for U.S. Appl. No. 16/710,738, filed Dec. 11, 2019, 52 Pages.

Non-Final Office Action mailed Sep. 15, 2022 for U.S. Appl. No. 16/710,738, filed Dec. 11, 2019, 57 pages.

Non-Final Office Action mailed Jan. 22, 2021 for U.S. Appl. No. 16/710,738, filed Dec. 11, 2019, 36 Pages.

Non-Final Office Action mailed Oct. 28, 2021 for U.S. Appl. No. 16/710,738, filed Dec. 11, 2019, 36 Pages.

Notice of Allowance mailed Apr. 11, 2023 for U.S. Appl. No. 16/710,738, filed Dec. 11, 2019, 48 pages.

* cited by examiner

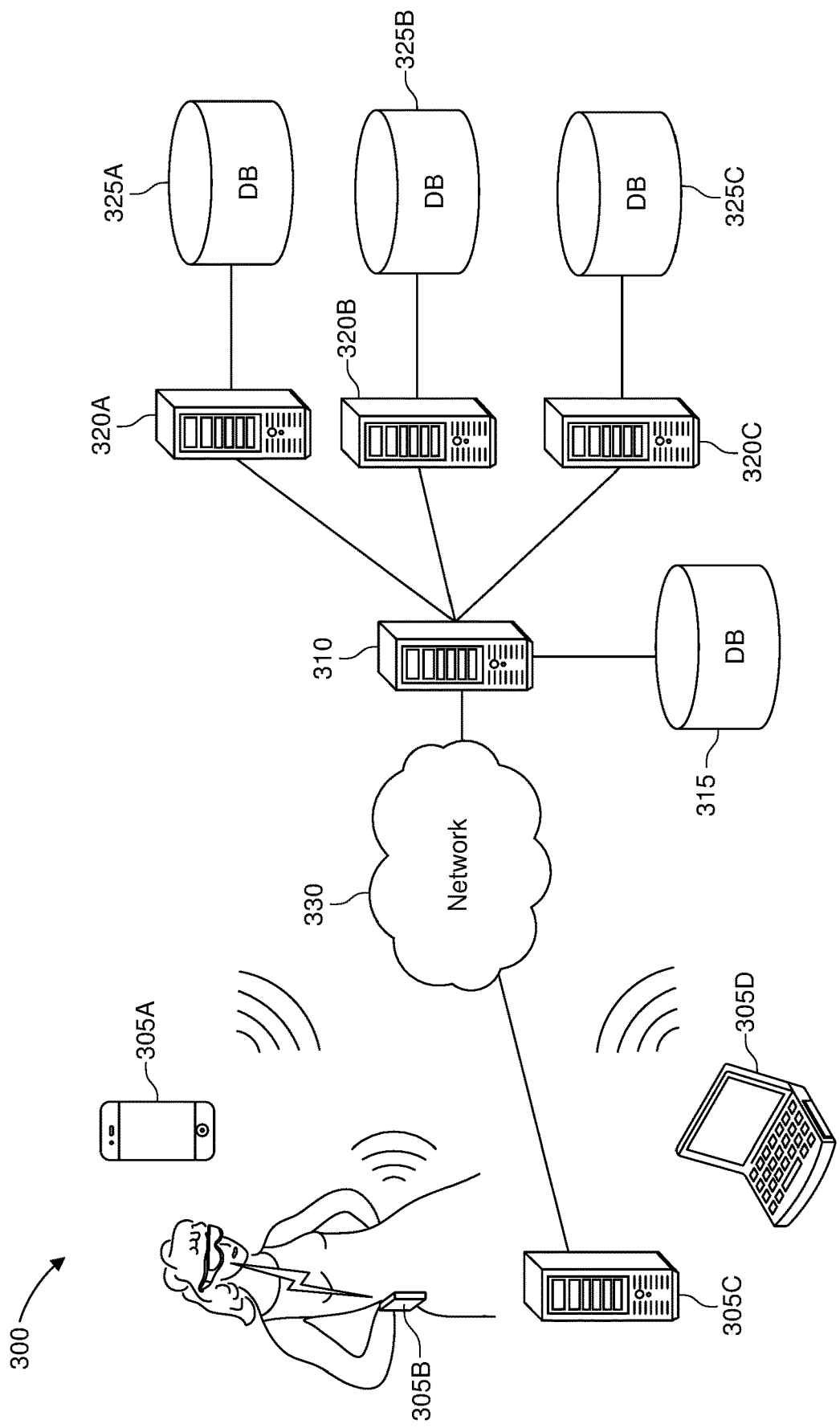

ARTIFICIAL REALITY (XR) LOCATION-BASED DISPLAYS AND INTERACTIONS

TECHNICAL FIELD

The present disclosure is directed to configuring artificial reality (XR) displays and interactions based on a history of entities and events at various XR locations.

BACKGROUND

Recent advancements in artificial reality (XR) have led to XR platforms for user assistance and entertainment in various artificial reality environments. The XR platforms may be based on virtual reality, augmented reality, mixed reality, hybrid reality or some combination and/or derivatives thereof. The artificial reality environment is a computer-generated simulated experience that gives users an immersive feel of an artificial world. Artificial reality experiences can include one or both of real-world and augmented or virtual contents. For example, the XR content may include generated content combined with captured (e.g., real-world) content. The XR content may include video, audio, haptic feedback, or some combination thereof, any of which may be presented in a single channel or in multiple channels. Applications of the XR environment include entertainment (e.g., video games), education (such as medical, military or sports training), medical treatment (such as post-trauma treatment therapies) business (such as virtual meetings), etc.

Generally, different XR platforms may be accessed by the users for different purposes. User engagement within the XR environment is an essential factor in shaping the positive experience of end-users. Convention XR systems may provide generic environments for interaction of the users. For example, conventional XR systems may lack personalization based on preferences of the users, user context, user selections, etc. Thus, the engagement of the user with the existing XR environments may be unsatisfactory.

BRIEF DESCRIPTION OF THE DRAWINGS

FIG. 3 is a block diagram illustrating an overview of an environment in which some implementations of the present technology can operate.

The techniques introduced here may be better understood by referring to the following Detailed Description in conjunction with the accompanying drawings, in which like reference numerals indicate identical or functionally similar elements.

DETAILED DESCRIPTION

Figure 1:
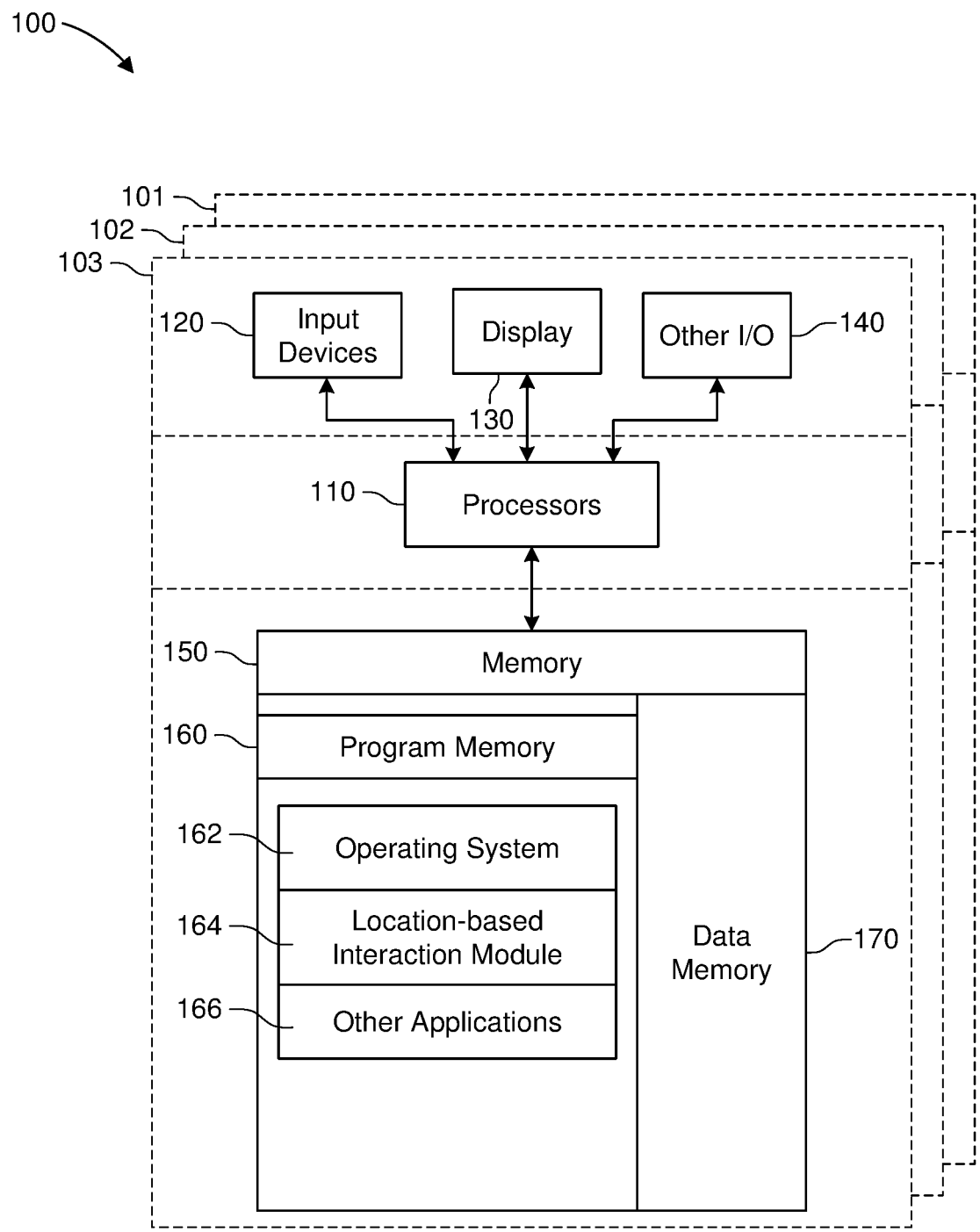
FIG. 1 is a block diagram illustrating an overview of devices on which some implementations of the present technology can operate.

Aspects of the present disclosure are directed to location-based interaction in an artificial reality (XR) environment by tracking historical states of locations and virtual entities; receiving inputs from users or an automatic system in the XR environment; and, based on the received inputs, matching virtual entities to the locations in the XR environment for a given timeframe or undoing modification of one or more features at the locations in the XR environment. In various implementations, this is accomplished using historical states associated with virtual entities or locations in the XR environment. For example, the virtual entities may include one or more virtual avatars of one or more users, one or more virtual objects, one or more social events that occurred at the location, etc. A system that provides XR content for the XR environment may be implemented on various platforms, including a head-mounted display (HMD) connected to a host computer system, a standalone HMD, a mobile device or computing system, or any other hardware platform capable of providing artificial reality content to one or more viewers.

In an exemplary scenario, the XR environment may be utilized by a user for different applications, for example, entertainment, healthcare, automotive industry, education development, social and relationship connections, etc. A computing system may track historical states of events or actions associated with a location in the XR environment. For example, the computing system may track which virtual entities were present at the location, history of all past events which took at the location, and the like. A log (e.g., database entries) may be created based on the tracked virtual entities. Further, a historical state of the location is generated based on the created log. Further, the historical states of the location may be filtered periodically. For example, if a historical state is stored for more than a predefined time, then that historical state may be removed from the database, multiple entries may be condensed into a single one, only a representative entry for multiple entries may be retained, or only relevant information from the historical state may be stored in the database.

In some cases, providing XR environment displays or configurations can be based on one or more inputs, received either from the user or from an automatic system. For example, the user may enter the XR environment through an XR device, and the computing system may determine an indication of a location based on the input received from the user automatically based on a determination of the user's XR environment location (e.g., based on the location a virtual avatar of the user in the XR environment). The received one or more inputs can indicate a command to either retrieve a historical state for the location including information of the virtual entities that previously existed at the location or undo a modification of the one or more features at the location. For example, if the virtual avatar is present proximate to a VR restaurant, then the automatic system may supply a command to retrieve information of virtual entities that previously existed at the VR restaurant. In another example, the user may also give a command through the XR device, to retrieve information about which of his friends have visited the VR restaurant in the past, or information associated with events occurred at the VR restaurant.

In response to the received inputs from the user or the automatic system, the computing system may match one or more virtual entities to the location in the XR environment for a given timeframe or undo the modification of the one or more features at the location in the XR environment. For example, the computing system determines the indication of the location based on a presence of the virtual avatar of a user at the location. The input may be provided by the user that corresponds to retrieval of information of friends of the user that may have visited the location. In such a case, the computing system may match the one or more virtual entities to the location to determine the information of friends of the user that may have visited the location. In another exemplary scenario, the input may be provided by the automatic system based on the presence of the virtual avatar of the user at the location. The computing system, in response to the input provided by the automatic system, may match the one or more virtual entities at the location to generate notifications associated with a presence of the one or more virtual entities. In another exemplary scenario, the received input may correspond to undo of the modification of the one or more features, such as a virtual object in the XR environment. In such a case, the computing system, in response to the input corresponding to undo of the modification, performs undo of the modification of the virtual object in the XR environment.

The matching or undoing may be based on the historical state of the location in the XR environment. Further, an indication of the matched one or more virtual entities to the location in the XR environment may be displayed on a user interface. In an example, after receiving the command from the user to retrieve information regarding his friends who have visited the restaurant in the given time-period in the past, the computing system may match all the friends in a friend list of the user with a criteria of visiting that restaurant (where the matching can be based on the data base entries of entities indexed with XR locations) and determine one or more friends from the friend list who satisfies the criteria. An indication of the one or more friends who have visited the restaurant in the given time-period may also be displayed, for example, in the XR environment or any display device associated with the XR environment. The user may also specify the given timeframe as a time-period in the past for which the information needs to be retrieved (e.g., a time range, for all past times, between now and a given past time, etc.). In other example, undoing of one or more features at the location, based on the indicated modification, is done in the XR environment. For example, a virtual object (such as a virtual tree or a virtual lane) that was previously included at the location in the XR environment by another user may be removed from the location by the user.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

In conventional systems, the histories of XR locations are not available to users. For example, in conventional XR environments, the user may visit a virtual location in the XR environment, but may not be able to interact with historical states of the location (such as retrieve information or undo the modification) within the XR environment. The computing system of the present disclosure, to the contrary, provides an XR environment, with interaction tools and configurations that provide immersive engagement for the users based on the history of the locations in the XR environment. For retrieval of historical state of a location in the XR environment, the computing system tracks virtual entities that previously existed at that location. The computing system provides options for users to view entities linked to XR locations through the historical states of those locations—e.g., to see who previously visited the XR location, what events took place at the XR location, what was the evolution of virtual objects that are at the location, etc. Further, the computing system provides a method to undo a modification of a feature associated with the location in the XR environment. For example, the virtual objects may be modified based on preferences of users, thereby providing an enhanced and immersive experience to the end users. Further, the computing system enables tracking of virtual entities, modification of features in the artificial environment, thereby providing a user-friendly and more interactive XR environment for the users.

Several implementations are discussed below in more detail in reference to the figures. FIG. 1 is a block diagram illustrating an overview of devices on which some implementations of the disclosed technology can operate. The devices can comprise hardware components of a device 100 that may provide location-based interaction in the XR environment. The device 100 can include one or more input devices 120 that provide input to the processor(s) 110 (e.g., CPU(s), GPU(s), HPU(s), etc.), notifying it of actions. The actions can be mediated by a hardware controller that interprets the signals received from the input devices 120 and communicates the information to the processors 110 using a communication protocol. The input devices 120 include, for example, a mouse, a keyboard, a touchscreen, an infrared sensor, a touchpad, a wearable input device, a camera- or image-based input device, a microphone, or other user input devices.

The processors 110 can be a single processing unit or multiple processing units in a device or distributed across multiple devices. The processors 110 can be coupled to other hardware devices, for example, with the use of a bus, such as a PCI bus or SCSI bus. The processors 110 can communicate with a hardware controller for devices, such as a display 130. The display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. The device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. The memory 150 can include a program memory 160 that stores programs and software, such as an operating system 162, a location-based interaction module 164, and other application programs 166. The memory 150 can also include a data memory 170, e.g., the first user data, location data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
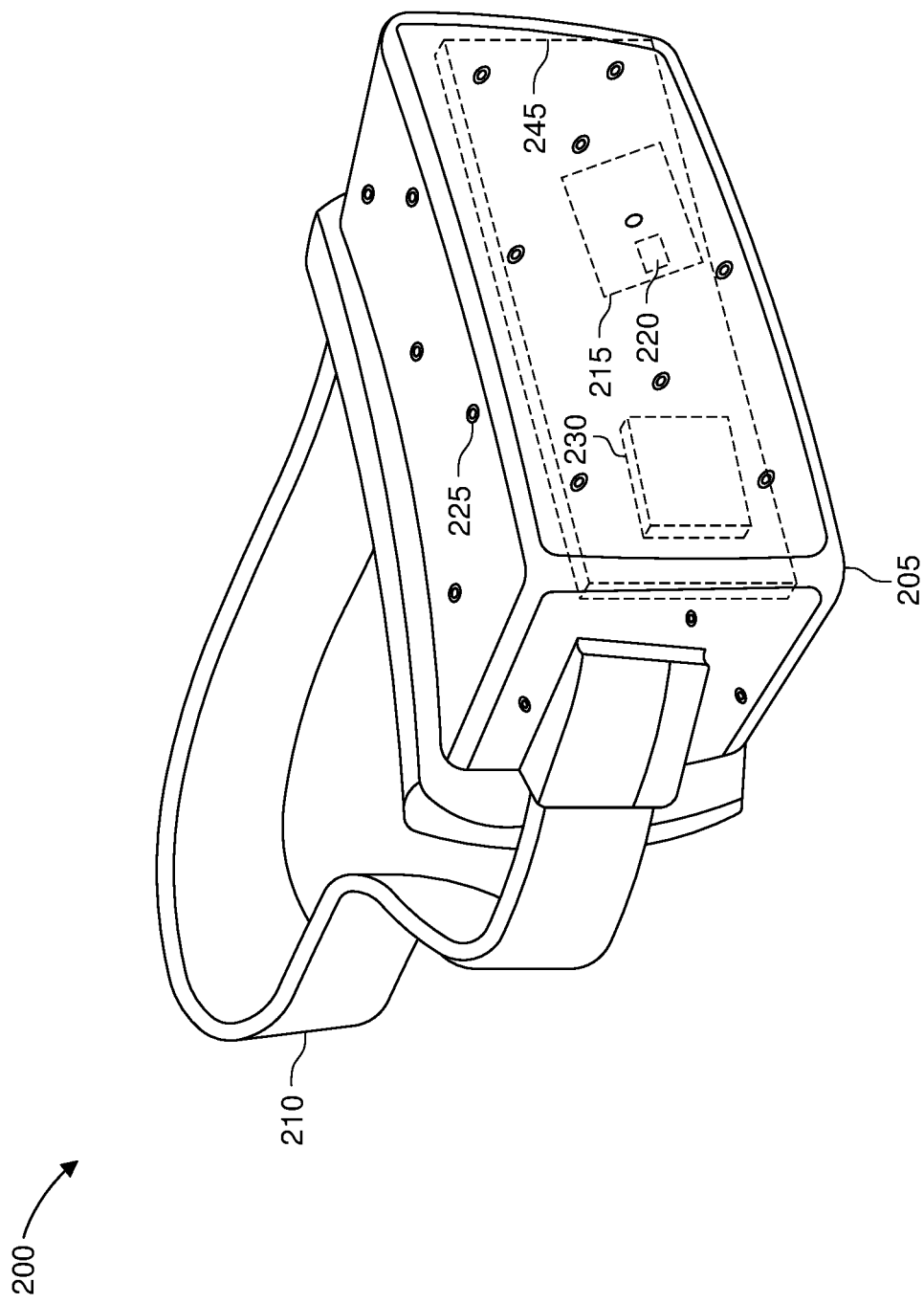
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
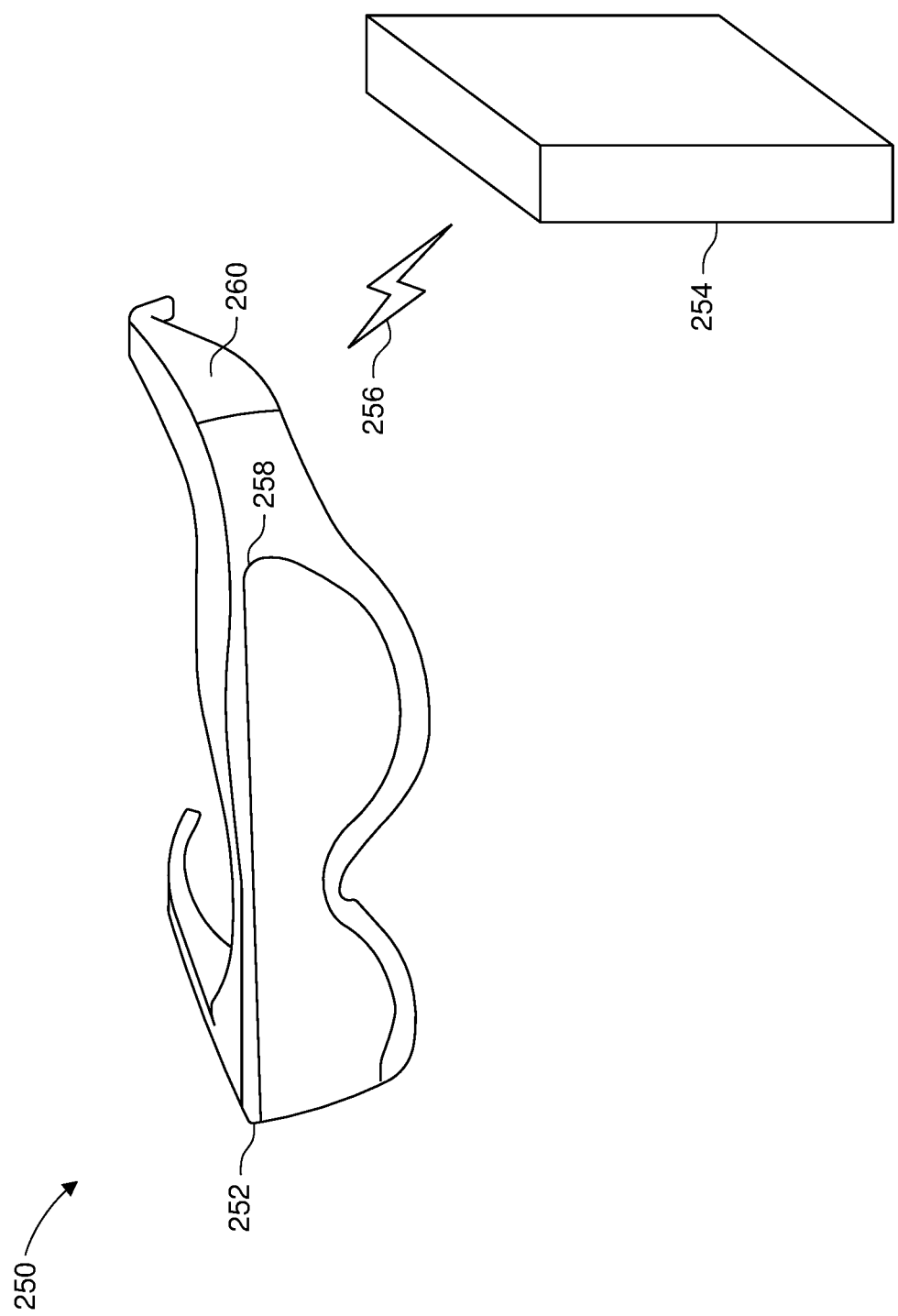
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
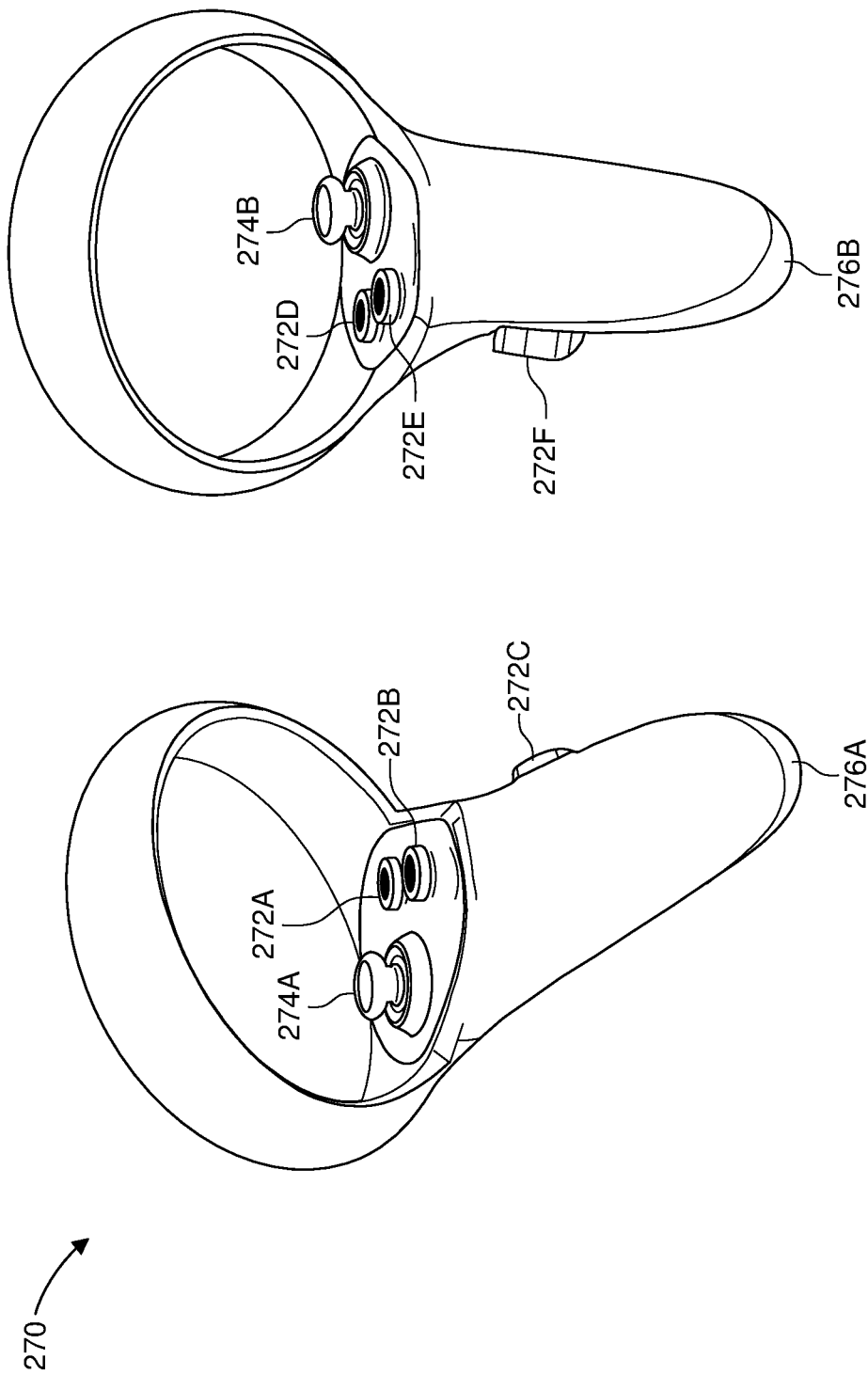
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
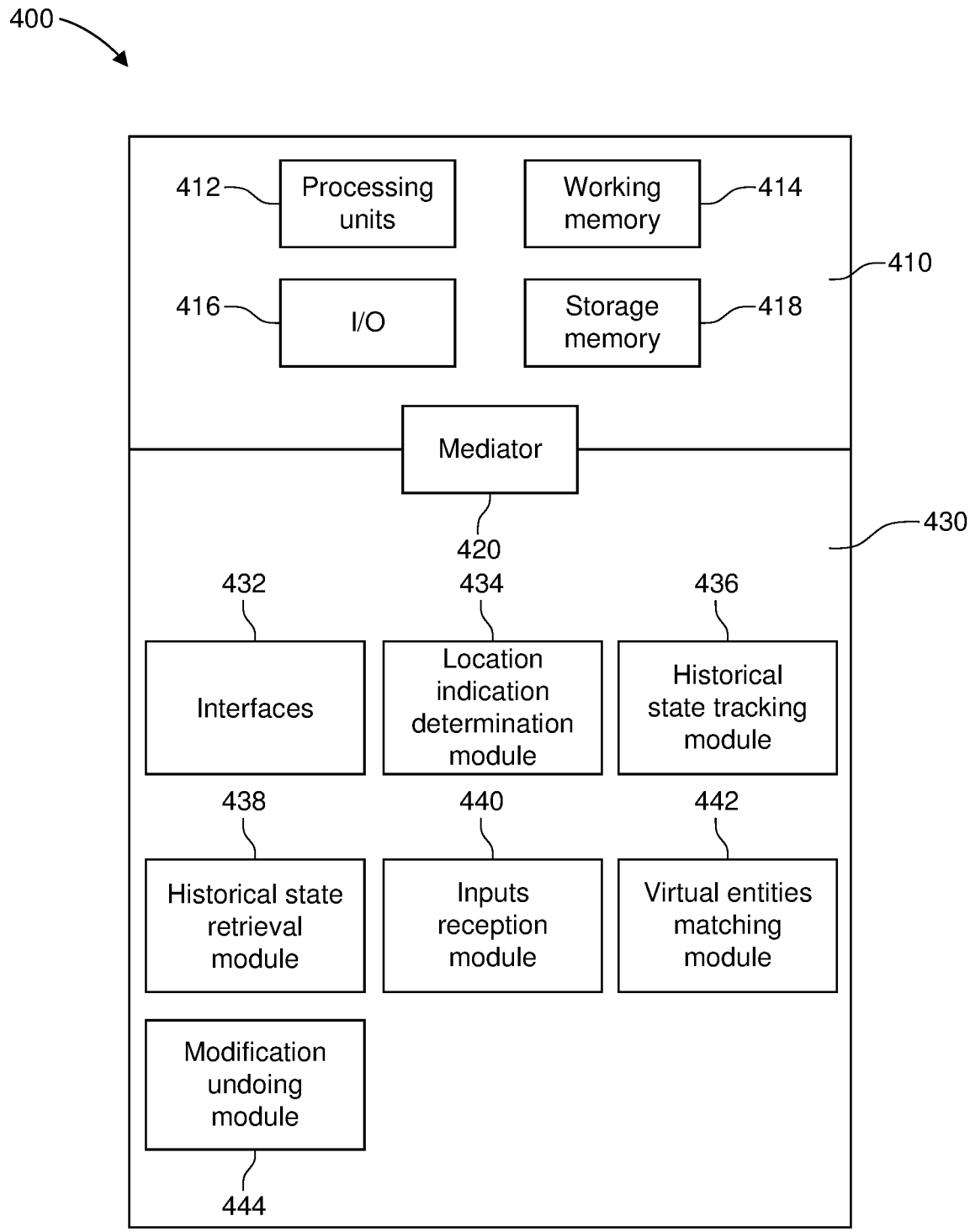
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for location-based interaction in the XR environment. Specialized components 430 can include a location indication determination module 434, a historical state tracking module 436, a historical state retrieval module 438, an inputs reception module 440, a virtual entities matching module 442, a modification undoing module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

The location indication determination module 434 is configured to determine an indication of the location in the XR environment. The location may be a place within an artificial world (area with defined border, event, building, restaurant, park, hospital, mall etc.). In one example, the indication of the location may be determined automatically by the location indication determination module 434. The location indication determination module 434 may determine a proximate location of a virtual avatar in the XR environment as the location. The virtual avatar of the user may be customizable based on a preference of the user. In another example, the indication of the location may be received as a user input. For example, the user may specify a location, by giving an input on an XR device. Additional details on the determination of the indication of the location are provided below in relation to block 602 of FIG. 6.

The historical state tracking module 436 is configured to periodically track the virtual entities that previously existed at the location. For example, the virtual entities may include one or more virtual avatars of one or more users that existed at the location, one or more virtual objects that existed at the location, one or more social events that occurred at the location, etc. In an exemplary embodiment, the historical state tracking module 436 tracks the presence and activities of the one or more virtual entities at the location at a particular time, and stores a record of that entity indexed to the location at the time. The historical state tracking module 436 can track various entity types such as avatars, virtual buildings, vehicles, flora, and fauna, etc. at the location. Moreover, the historical state tracking module 436 may further track any changes in the modification of the one or more virtual objects. In another exemplary embodiment, the historical state tracking module 436 tracks the one or more social events or activities performed at the location, such as a musical concert, the book launch event and the like. The historical state tracking module 436 may periodically track the virtual entities at different intervals, such as per second, per minute, per hour etc. Based on the tracked virtual entities, a log of the tracked virtual entities may be created in the database. Additional details on the periodic tracking of the virtual entities are provided below in relation to block 502 of FIG. 5.

The historical state retrieval module 438 is configured to retrieve the historical state of the location in the XR environment. The historical state retrieval module 438 may retrieve the historical state of the location from the database, such as the databases 315 and 325. In an example, the historical state retrieval module 438 may retrieve the historical state of the location based on the created log of the virtual entities at the location that is stored in the database. The historical state retrieval module 438 may retrieve the historical state of the location from the database via the network 330. In one example, the historical state of the location may include information related to virtual objects, for example, virtual avatars that previously existed at the location. In another example, the historical state of the location may include one or more events that previously occurred at the location or associated with the location. The one or more events may include, but are not limited to, social events, educational events, training sessions, etc. Additional details on the retrieval of the historical state are provided below in relation to block 604 of FIG. 6.

The inputs reception module 440 is configured to receive one or more inputs from the user or the automatic system. The inputs reception module 440 may receive the one or more inputs specifying a command related to the historical state of the location. The one or more inputs can be a touch input, an audio input, a text based input, or other input. The command further indicates either to retrieve information of virtual entities that previously existed at the location or to undo a modification of one or more features at the location. For example, the inputs reception module 440 may receive the command from the user. In an example, the user may give commands requesting identification of which famous personalities were present at a location X, which of his friends have visited the location Y in the past, how the location Z looked like five years back, what events have occurred at the location A, to undo an action that was performed at the location B in the past, and the like. In an implementation, the commands from the user may also include a time-period to limit the search in the past. In an implementation, the user may give an input specifying a command to disable tracking presence of the user in the historical states for the XR environment, for one or more timeframes.

In another example, the inputs reception module 440 may receive a command from the automatic system, to retrieve information of virtual entities that previously existed at the location. For example, a virtual avatar is passing nearby a virtual shopping mall in the XR environment, then the automatic system may give a command to the inputs reception module 440, to retrieve information of virtual entities that existed at the shopping mall. Additional details on the reception of the inputs are provided below in relation to block 606 of FIG. 6.

The virtual entities matching module 442 is configured to match, based on the historical state of the location, one or more virtual entities to the location in the XR environment for a given timeframe. The virtual entities matching module 442 may filter the virtual entities in the XR environment using the command from the user or the automatic system as a criteria to match, from all the virtual entities, one or more virtual entities with the location specified in the command. For example, if the user gives command to retrieve information about which of his friends visited a specific location, the virtual entities matching module 442 will then match the virtual entities that user wants to enquire about, with the historical state of the location. The virtual entities matching module 442 will filter the virtual entities based on the preference of the user. For example, if the preference of the user is to get information about one or more famous personalities that visited the location, the virtual entities matching module 442 filters the one or more virtual entities corresponding to the designated one or more famous personalities that visited the location. In such a manner, the virtual entities matching module 442 filters the virtual entities from all the virtual entities based on the preference of the user. The virtual entities matching module 442 may then display an indication of the matched one or more virtual entities based on the user preference or based on the command received from the automatic system. In an implementation, the virtual entities matching module 442 may display the indication of the matched one or more virtual entities on a display device or the XR device. Further, format of the display of the indication of the matched one or more virtual entities may include a two-dimensional (2D) image, a 2D virtual object, or a 2D video. Additional details on the matching of the one or more virtual entities to the location are provided below in relation to block 608A of FIG. 6.

The modification undoing module 444 is configured to undo the indicated modification of one or more features at a specific location in the XR environment, based on the historical state of the location. The indication of undoing modification of the one or more features is received as input by inputs reception module 440. If the user gives an input to undo the modification of the one or more features at the specific location, the modification undoing module 444 may undo the modification of the one or more features at the specific location in the XR environment as indicated by the user. In an example, a first user controlling a first virtual avatar may add an adventure ride in a theme park in the XR environment at a first instance of time. A second user controlling a second virtual avatar may visit the theme park at a second instance of time after the first user added the adventure ride in the theme park. If the second user wants to undo the addition of the adventure ride in the theme park, then the user controlling the second virtual avatar may give a command, to the inputs reception module 440, to under the adventure ride addition. In this exemplary scenario, the modification undoing module 444 may undo the modification based on the command given by the second user. Additional details on the undoing of the indicated modification of one or more features are provided below in relation to block 608C of FIG. 6.

Those skilled in the art will appreciate that the components illustrated in FIGS. 1-4 described above, and in each of the flow diagrams discussed below, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described below.

Figure 5:
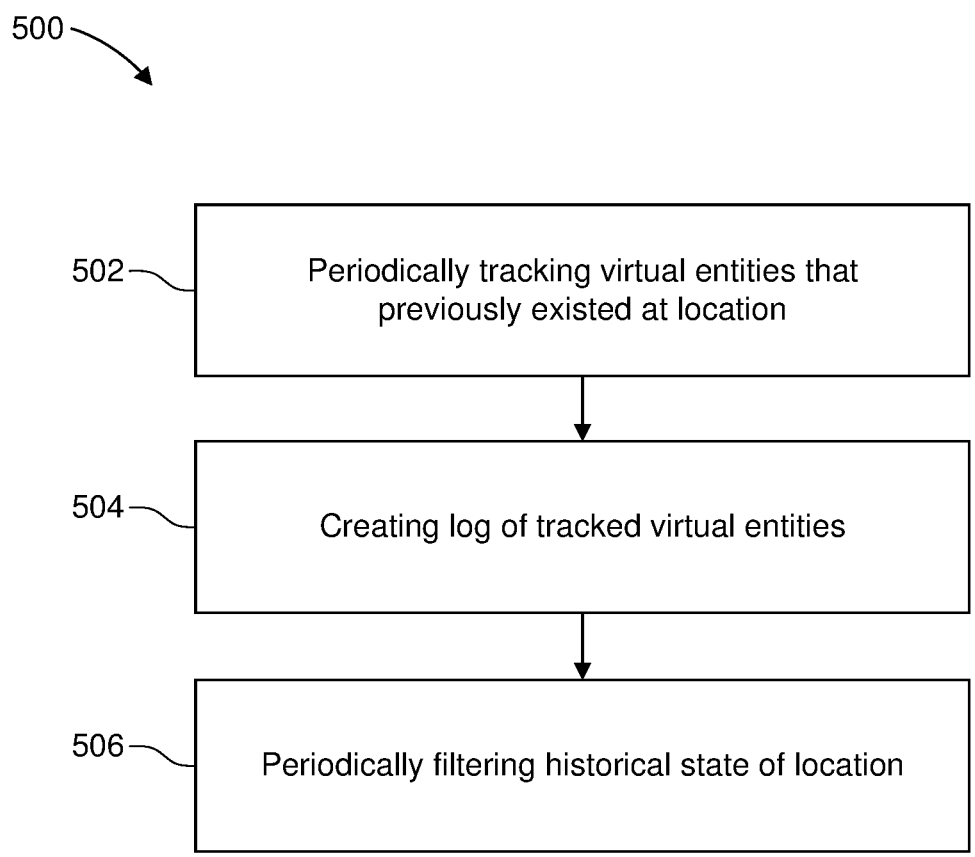
FIG. 5 is a flow diagram illustrating a process used in some implementations for generating historical state of a location.

FIG. 5 is a flow diagram illustrating a process 500 used in some implementations for generating the historical state of the location. In some implementations, the process 500 can be performed as a background process by the computing system, as the user interacts with the XR environment. For example, the process 500 may be performed as the virtual avatar of the user moves in the XR environment, attend social events at various locations in the XR environment, and modifies virtual objects in the XR environment. In various implementations, process 500 can be performed on an XR device or on a server supporting XR environment presentations and configuration.

The steps identified in FIG. 5, and the order thereof, are exemplary and may include various alternatives, equivalents, or derivations thereof including but not limited to the order of execution of the same. The steps of the process of FIG. 5, and its various alternatives, may be embodied in hardware or software including a computer-readable storage medium (e.g., optical disc, memory card, or hard drive) including instructions executable by the processors 110 or the components 400. The process 500 is at least partially performed either on the one or more client computing devices 305A-D, or on the server computing devices 310 and 320, or both.

At block 502, one or more computing devices may be applied to periodically track the virtual entities that previously existed at the location. In an embodiment, the virtual entities may include one or more virtual avatars of one or more users that existed at the location, one or more virtual objects that existed at the location, or one or more social events that occurred at the location. In an implementation, the process 500 periodically tracks one or more virtual avatars that previously visited the location. In another example, process 500 periodically tracks one or more social events that occurred at the location. The tracking of the virtual entities is performed as those virtual entities move around, are created, are modified, etc., at different locations in the XR environment.

For example, the virtual entities associated with the location may be tracked per second, per minute, per hour etc. In an implementation the virtual entities may be tracked at periodic intervals which may be pre-defined intervals or provided by the user as input. In other cases, creating logs of virtual entity location may be trigged by changes, such that a threshold change in an entity's location or other modification, where the trigger causes creation of a change event for the entity, cross-reference to a location, in a database. The one of more social events may include, but are not limited to, events such as a meal, coffee, drinks, a get-together, a sport event, a meeting, an activity (e.g., hiking), a show/performance (e.g., live performance/concert), a movie, social network event, video performance, a party, an interview, a business meeting, or any other event.

At block 504, a log of the tracked virtual entities may be created. For example, each virtual avatar of the one or more avatars and each event of the one or more events may be tracked based on the location, and a log is created in form of indexing each virtual entity with a corresponding location. For example, a virtual avatar visits a restaurant, a hotel, and a park in two days. Then, in this example, the virtual avatar may be indexed to all the three locations corresponding to the restaurant, the hotel, and the park. In some implementations, the indexing may be more granular, e.g., the avatar is indexed to it's position every one second or time it moves at least 1 foot in virtual space. In an implementation, if a virtual entity has visited particular locations and attended particular events, then all this information associated with that virtual entity is stored in the form of a log which may be stored in the databases 315 and 325. Each of the databases 315 and 325 may be a centralized database, a cloud database, a distributed database, and the like. The databases 315 and 325 may also be public ledgers, for example blockchain. In an implementation, the databases 315 and 325 store a log for each virtual entity at different locations.

At block 506, historical states of the location are periodically filtered. Periodical filtering of the historical states is further based on a determination that a storage time of a set of states of the historical state of the location is more than a predefined duration of time. In one example, a virtual entity visits a first location at a current time, at a second location one millisecond later, and at a third location 2 milliseconds later. Storing a log for such a movement of the virtual entity forever may demand excessive space in the databases 315 and 325. The intervals at which the movement of the virtual entity is logged decides the amount of space required in the databases 315 and 325. In another example, the movement of the virtual entity may be tracked for every first interval for a first time-period in the past. The movement of the virtual entity may be tracked for every second interval for a second time-period prior to the first time-period in the past. The first interval is smaller than the second interval. In an example, the movement of the virtual entity may be tracked for every millisecond for 10 minute time-period in the past and the movement of the virtual entity may be tracked for every minute for hour time-period following the 10 minute period in the past. Thus, the filtering can include either replacing the more granular stored locations with an average location for that less granular time period or deleting all but one representative location of the more granular stored locations for that less granular time period. In this way, more data may be logged for the 10 minute time-period in the past from the current time and less data may be logged for the 1 hour time-period in the past following the 10 minute time-period. In this manner, database storage can be saved by keeping fine grained version of the events that happened recently and less grained version of the events happened further in the past.

Figure 6:
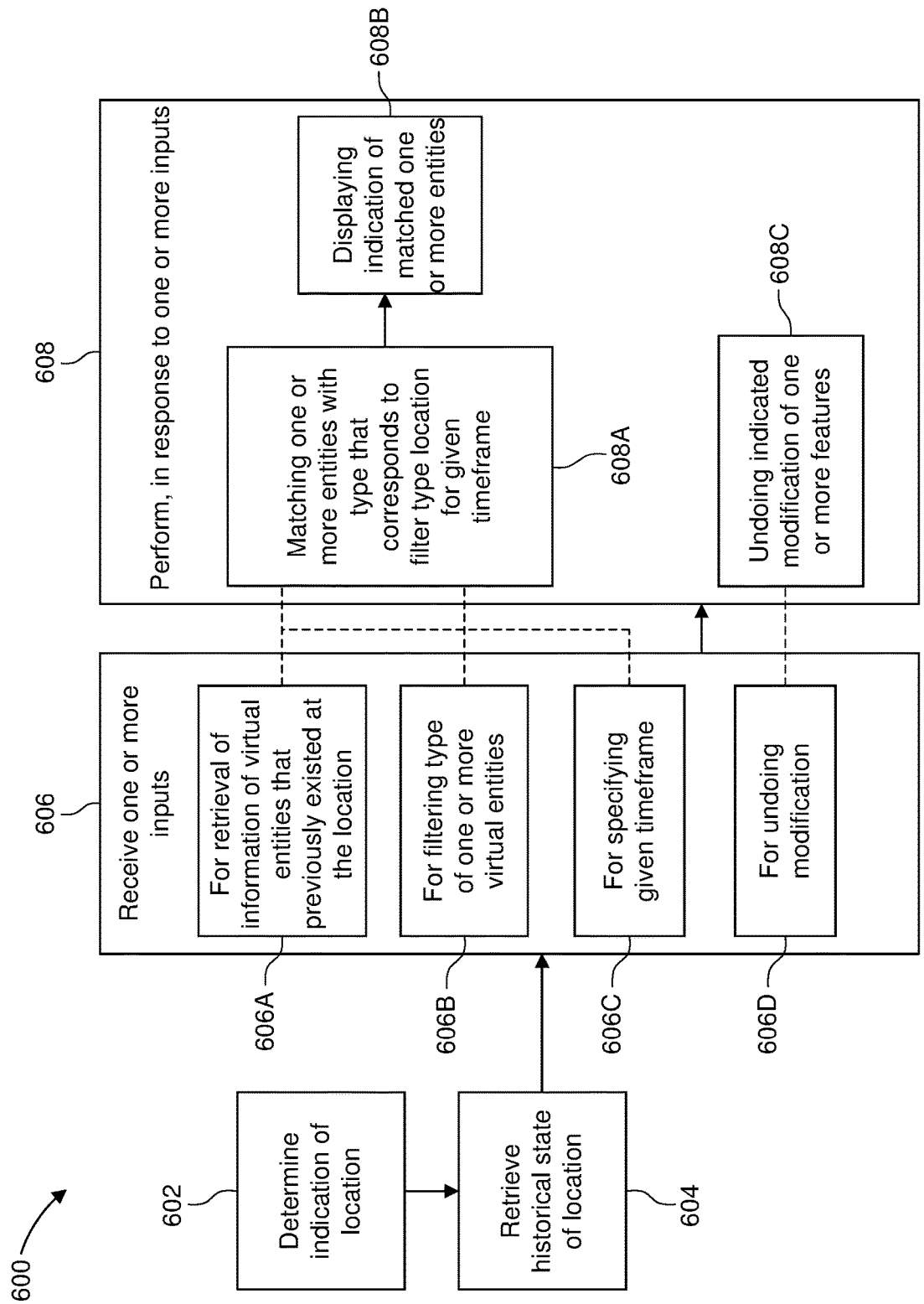
FIG. 6 is a flow diagram illustrating a process used in some implementations for location-based interaction in an artificial reality (XR) environment.

FIG. 6 is a flow diagram illustrating a process 600 used in some implementations for location-based interaction in the XR environment. The steps identified in FIG. 6, and the order thereof, are exemplary and may include various alternatives, equivalents, or derivations thereof including but not limited to the order of execution of the same. The steps of the process of FIG. 6, and its various alternatives, may be embodied in hardware or software including a computer-readable storage medium (e.g., optical disc, memory card, or hard drive) including instructions executable by the processors 110 or the components 400. The process 600 can be performed on the one or more client computing devices 305A-D or on one or more server devices 310 or 320, supporting such client computing devices. In some implementations, portions of process 600 can be performed on each of the client computing devices 305A-D and on one or more server devices 310 or 320.

In an implementation, the process 600 may be triggered when the computing system and the XR device are connected via the network 330. Once the XR device is activated by the user, the computing system may display the XR environment on the XR device and the virtual avatar of the user may be displayed at a location (such as the location where the virtual avatar is present) in the XR environment.

At block 602, an indication of a location is determined in the XR environment. The location may be a place within the XR environment (particular point, area with defined border, event, building, or other defined space (e.g., restaurant, park, hospital, mall etc.). In one implementation, the indication of the location may be determined by an automatic system. For example, a presence of the virtual avatar at the location may be automatically detected by the automatic system. In an exemplary scenario, the location of the virtual avatar may change in the XR environment, based on a movement of the user or an input provided by the user. The automatic system may automatically detect the updated locations that the virtual avatar visits in the XR environment. In another implementation, a user input is received from a user to specify the indication of the location. The user input may correspond to at least a text input, a voice input, a touch input, a gesture-based input and the like. For example, the received text input or the voice input may be "Restaurant A".

The computing system determines the indication of the location "Restaurant A" based on the text input or the voice input. In another example, the gesture-based input may include pointing towards the location in the XR environment by the virtual avatar of the user. The computing system may detect a gesture of hand of the user to determine the location at which the virtual avatar is pointing. In yet another example, the virtual avatar may be present at the location, and a command to activate a control for the location may be received from the user. Based on the command, the indication of the location is determined.

At block 604, the historical state of the location is retrieved. The historical state may indicate a prior condition of the virtual entity at the location. The historical state of the location may include data of the virtual entities, such as the one or more virtual avatars of one or more users that existed at the location, the one or more virtual objects that existed at the location, or the one or more social events that occurred at the location. The data may include, for example, the log of the tracked virtual entities created periodically for the location. The log may include the date and time of the presence of the virtual avatars at the location, the date and time of creation or modification of the virtual objects at the location and the date and time of the social events that have taken place at the location. For example, if the indication of the location is determined to be a theme park in the XR environment, the computing system may retrieve the historical state of the theme park in the XR environment. The historical state may include information associated with virtual avatars existed at the theme park in the past, events happened at the theme park, other virtual objects that have been created or moved to the theme park, etc. The historical state of the location is retrieved using the stored log of the virtual entities that are indexed to the location in the databases 315 and 325. In an example, while retrieving the historical state of the location, a particular historical state of a user may not show up, due to the privacy setting of the user. In some implementations, the retrieval of the historical state of the location is performed in block 608A along with the filtering of entities, e.g., as part of a single database query.

In one implementation, a user may give an input specifying a command to disable tracking presence of the user in historical states for the XR environment, for one or more timeframes. Once the computing system receives the command to disable tracking presence of the user, the computing system may prevent the tracking of the presence of the user. For example, the user may require disabling the tracking for a duration of one month. In such a case, the computing system disables the tracking for the duration of one month. In one or more implementations, the user may require disabling the tracking for one or more locations of the locations in the XR environment. For example, the user may be a famous chef who may permit tracking of its presence only at different restaurants in the XR environment. In such a case, the computing system disables the tracking for all the locations except the restaurants for the user.

At block 606, the computing system receives one or more inputs. The one or more inputs may be received either from the user or the automatic system. The one or more inputs can be, for example, a touch input, an audio input, a text-based input. The user may provide one or more inputs on an XR device communicatively coupled to the computing system. The XR device may be an electronic device, such as a XR headset or an XR eyewear which is required for interaction of the users with the XR environment. The one or more inputs can be received for various purposes, which are described in detail below in relation to block 606A-606D.

At block 606A, one or more inputs are received providing a command to retrieve information of virtual entities that previously existed at the location indicated at block 602. The virtual entities may include one or more virtual avatars of one or more users that existed at the location, NPCs that existed at the location, inanimate virtual objects that existed at the location, one or more social events that occurred at the location, or any other entity that can be represented as a visual element in the XR environment. For example, the social events may be a music concert, a book launch event, etc. The virtual avatar of a user may be customizable based on preference of the user.

At block 606B, one or more inputs are received for filtering type of one or more virtual entities to be shown the history of for the location. For example, if a user wants to know about his friends who visited a certain location in the XR environment, the user may provide inputs indicating this via the XR device. In another example, the first user may enquire about famous personalities who visited the location. In yet a further example, the user may supply an input specifying a filter to show only virtual objects or events of a certain type, size, or genre, etc.

Figure 8:
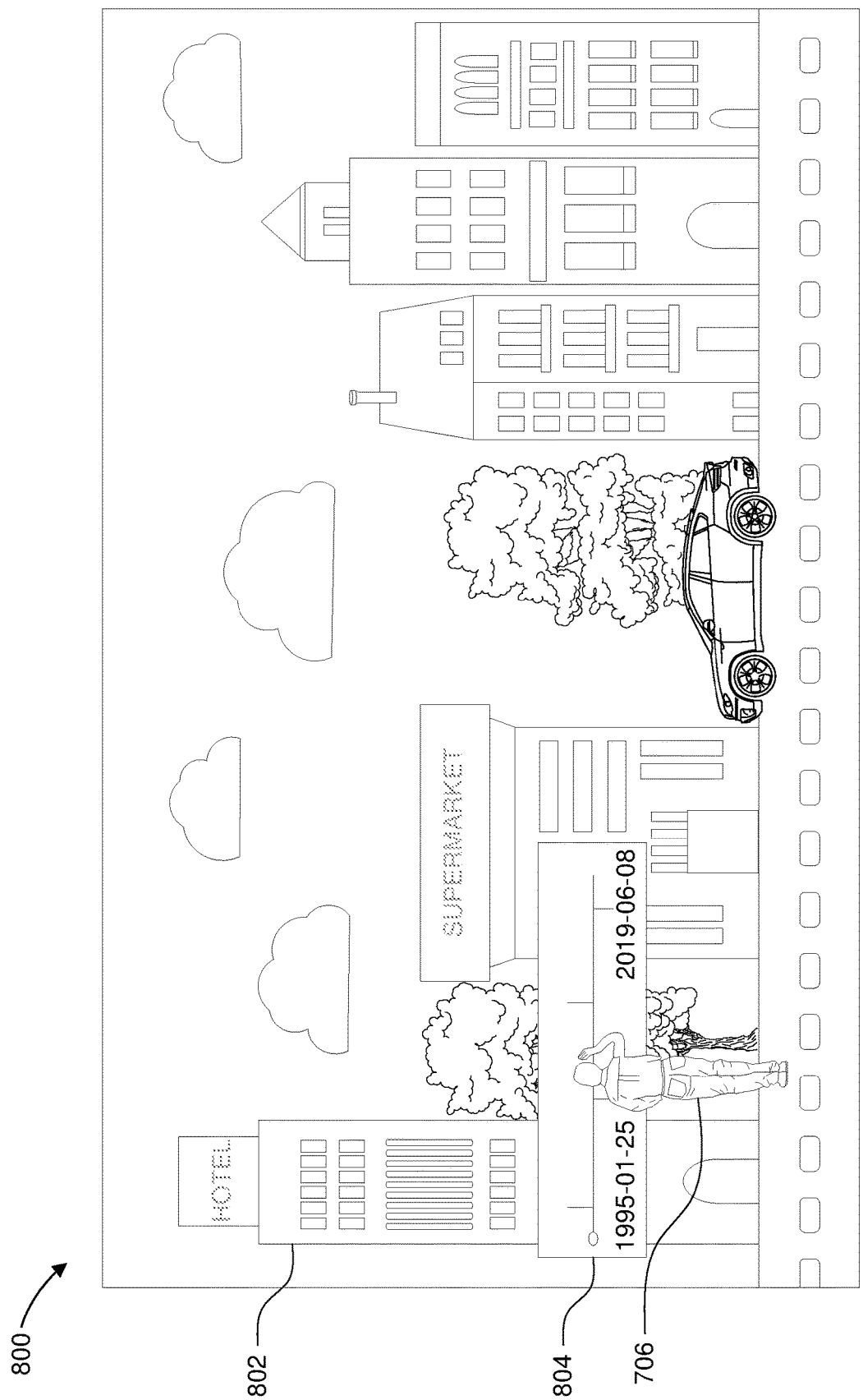
FIG. 8 is a conceptual diagram illustrating an example user interface for displaying a slider in the XR environment.

Referring to block 606C, the user may also specify a timeframe in which the user wants to retrieve the results for entities indexed to the location. For example, the user may want to know which of his friends visited a restaurant in the last week, or on a specific date. In one implementation, this may be input by the user using a displayed slider in the XR environment. The slider may be utilized to adjust the time frame by use of a gesture of the user as the input. An exemplary slider is shown in FIG. 8. In another example, indication of the time frame may be a default time frame of the past for example last 10 minutes or 10 days, and the like. The user may also specify the timeframe as a voice command or by entering text. For example, when the user is present at a specific location in the XR environment, the user may output voice instructions to show that specific location as it existed 10 years ago.

In an embodiment, inputs may be received from the automatic system based on a determination of a location of a virtual avatar associated with a controlling user. The automatic system may then give a command to the computing system to retrieve information of virtual entities that previously existed at the location, corresponding to users with a specified relationship to the controlling user. For example, the virtual avatar of the user is present at the location at which an event is being hosted in the XR environment. In such a case, the automatic system determines the presence of the virtual avatar at the location. The computing system receives the input from the automatic system for retrieving information of the virtual entities associated with the user that were present at the location. For example, information regarding user's friends earlier present at the location may be retrieved. The retrieved information may be displayed as a notification in the XR environment.

At block 606D one or more inputs are received providing a command to undo a modification at the location, such as the creation or change of a virtual object. Thus, the user may give a command to remove a specific virtual object; to roll back the state of the location to a previous state; to select the previous state of a particular virtual object at the location (e.g., shown to the user from a previous iteration of process 600) to revert the virtual object to that previous state, etc. For example, a first virtual avatar is present at a theme park in the XR environment, and the first virtual avatar wants to undo a modification performed at the theme park in the past. In an example, the user may give a command to the computing system to remove a specific ride from the theme park which was added by a second virtual avatar, in the past; to roll back the state of the theme park to a previous state; to select the previous state of a particular ride at the theme park (e.g., shown to the user from a previous iteration of process 600) to revert the ride to that previous state, etc. In this example, the first virtual avatar may interact with the XR environment and may alter the visual presentation of the park by undoing modification of a feature of the theme park in the XR environment.

At block 608, the computing system performs matching or undoing, in response to the corresponding received one or more inputs from block 606. Referring to block 608A, matching of one or more virtual entities with type that corresponds to filter type location, is performed, for a given timeframe. Matching of one or more virtual entities with the location is performed based on the historical state of the location. When the user indicates a location, and gives input to filter virtual entities for a specific timeframe, the computing system determines one or more virtual entities, as the matched one or more virtual entities, that are indexed to the user indicated location in the given timeframe. Further, the computing system filters the virtual entities based on the input provided by the user or the computing system. In some implementations, this can be done with the local historical state retrieved at block 604. In other implementations, instead of the historical state being retrieved at block 604, it can be retrieved at block 608A, filtered through a database query implementing the filter criteria. In an implementation, the computing system may further validate that the matched one or more virtual entities correspond to a given user indicated to have been at the location. For example, if a restaurant owner is advertising the restaurant claiming that a famous personality has visited the restaurant. A user may validate this information by viewing the historical state of the location. The computing system may validate whether the famous personality visited the restaurant or not, by retrieving the historical state of the restaurant.

At block 608B, an indication of the matched one or more virtual entities are displayed. Further, the matched one or more virtual entities may be displayed by displaying one or more user interface (UI) elements. In one implementation, the one or more UI elements can be a video, 2D image, an audio, etc. In an example, the user may need to replay an event that happened 2 days ago at the location. The replay of the event may be displayed as the video in the XR environment. In another example, information of the presence of the famous personalities that have visited the location in the 10 years may be displayed in form of the image. In yet another example, the information of the friends of the users have visited the location or may be present at the location may be provided in form of the audio.

At block 608C, undoing modification of one or more features is performed. For example, in response to a command given to the computing system by the user to remove a signboard placed outside a hotel, which was added in the past by a specific virtual avatar, in the XR environment. In this example, the computing system performs an undoing operation to the modification of the one or more feature in the XR environment. The computing system may undo the modification at the location, such as the creation or change of a virtual object. For example, removing a specific virtual object; to roll back the state of the location to a previous state; to select the previous state of a particular virtual object at the location (e.g., shown to the user from a previous iteration of process 600) to revert the virtual object to that previous state, etc. Undoing modification of the one or more features associated with a location may include undo of actions performed by a virtual avatar in the past, for example, altering a visual appearance of a location based on the preference of a virtual avatar. An exemplary undoing of the modification is described in FIG. 9A and FIG. 9B.

Figure 7:
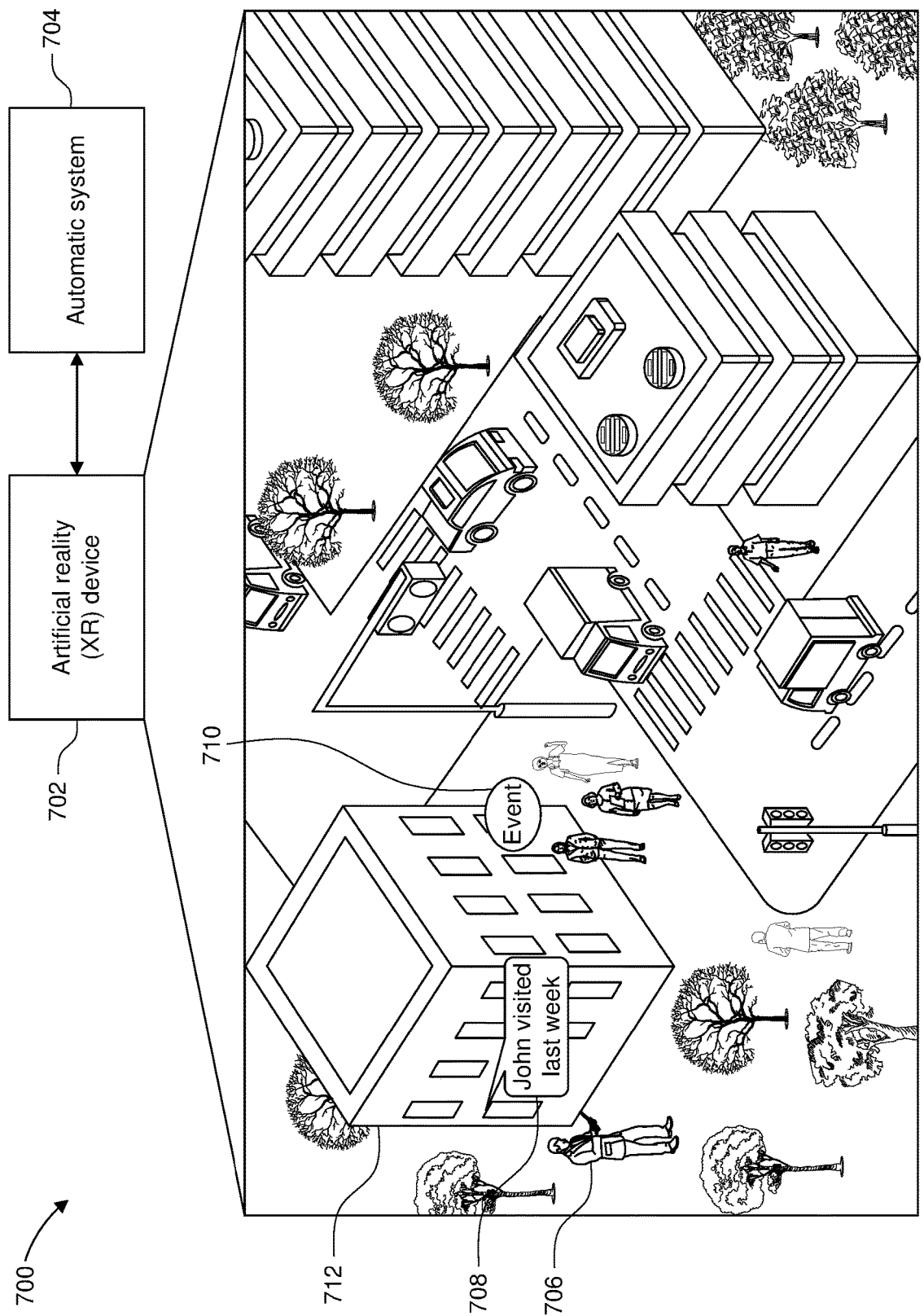
FIG. 7 is a conceptual diagram illustrating an example user interface for displaying notifications associated with the location in the XR environment.

FIG. 7 is a conceptual diagram illustrating an example user interface 700 for displaying notifications associated with the location in the XR environment. The user interface 700 displays the exemplary XR environment for depiction of displaying notifications associated with the location in the XR environment. The user interface 700 includes an XR device 702, an automatic system 704, different virtual avatars of different users, such as a first virtual avatar 706 of a first user, a notification 708, an event 710, and a restaurant 712.

The XR device 702 may be at least one of a virtual reality (VR) device, an augmented reality (AR) device, or a mixed reality (MR) device. The first virtual avatar 706 of the first user may be customizable based on preference of the first user. Examples of the VR device, the AR device, or the MR device may include, but may not be limited to VR headsets or smart glasses. Examples of the XR device 702 may include, but are not limited to, the HMD connected to a host computer system, a standalone HMD, a mobile device or computing system, or any other hardware platform capable of providing artificial reality content to one or more viewers. In an example, the first virtual avatar of the first user may be displayed via the VR headsets. The automatic system 704 may be configured to determine an indication of the location of the first virtual avatar 706. In an implementation, the automatic system 704 may be a part of the computing system. The indication of the location is based on controlling user's avatar being at or proximate to the location. In this example, the first virtual avatar 706 is controlled by the first user.

After determining the indication of the location of the first virtual avatar 706, the automatic system 704 may give a command to the computing system, to retrieve the historical state associated with the location. In this exemplary scenario, the automatic system 704 determines the location of the first virtual avatar proximate to the restaurant 712. The automatic system 704 gives input to retrieve historical state of the restaurant 712. The computing system retrieves the historical state of virtual entities that previously existed at the restaurant 712. The computing system, as part of the retrieval of the historical state, filters and matches those virtual entities that have a specified relationship to the first virtual avatar 706. The notification 708 is then displayed to the first virtual avatar 706 saying his friend John visited the restaurant 712 last week. The automatic system 704 automatically generates notifications associated with the presence of the one or more virtual entities which have specified relationship with the first virtual avatar 706.

Further, the XR environment also shows the event 710 that happened at or nearby the restaurant 712. In this example, the event 710 was a small get together of friends working in different workplaces. In another example the event 710 may include such as breakfast, lunch, dinner, coffee, drinks, a get-together, a sport event a meeting, an activity (e.g., hiking), a show/performance (e.g., live performance/concert), a movie, gambling, social network event, video performance, a party, an interview, a business meeting, or any other event. A user controlling a virtual avatar that passes the location can request a history of the location and receive an indication of the event 710, e.g., with a notification shown proximate to the virtual avatar regarding the event 710.

FIG. 8 is a conceptual diagram illustrating an example user interface for displaying a slider to a user in the XR environment. The user interface 800 includes a hotel 802, the first virtual avatar 706, and a slider 804. The user interface 800 displays an exemplary XR environment for depiction of display of the slider 804 to the first virtual avatar 706. The first virtual avatar 706 may select a time frame using the slider 804. The selected timeframe indicates a timeframe for which the first virtual avatar 706 wants to retrieve filtered results. For example, the first virtual avatar 706 may want to know which of his friends visited the hotel 802 on a specific date. The first virtual avatar 706 may slide the slider to choose any date, month, and year in the past. In one example, the first virtual avatar 706 may also give command to replay actions performed by the one or more virtual entities at the hotel 802. In another example, the first virtual avatar 706 may also give command to replay a view of the hotel 802 for the given timeframe. For example, by sliding the slider across a timeframe, the XR environment can be displayed as a replay of that timeframe corresponding to the current position of the slider. Similarly, the first virtual avatar 706 may also give command to replay events engaged by the one or more virtual entities at the hotel 802 at a time specified by the first virtual avatar 706. For example, if the first virtual avatar 706 gives a command to visualize how the hotel 802 looked ten years ago, the computing system may show the view of hotel ten years ago, e.g., by sowing the XR environment as it was tat that time, showing a 2D image or a video from that time, and the like.

Figure 9A:
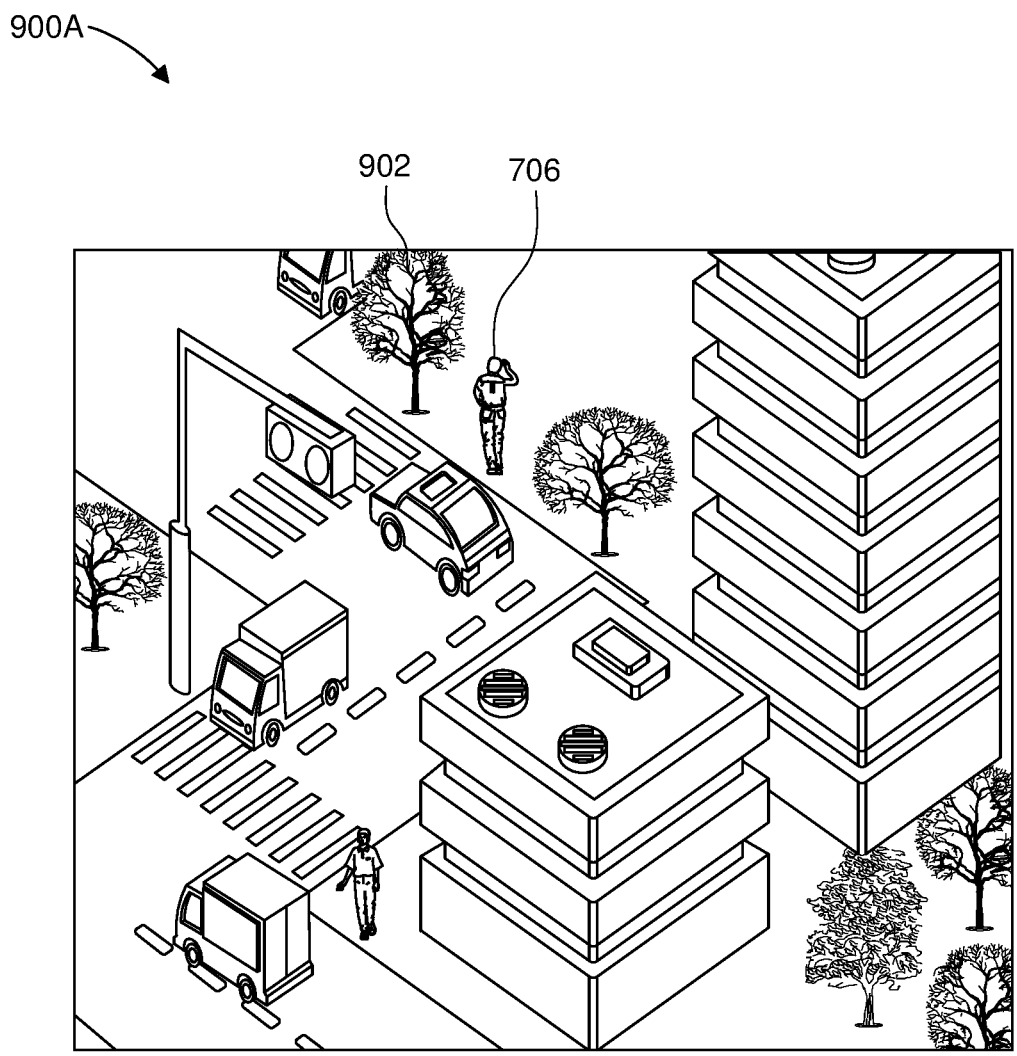
FIG. 9A and FIG. 9B are conceptual diagrams collectively illustrating an example user interface for modification of one or more features at the location in the XR environment.
Figure 9B:
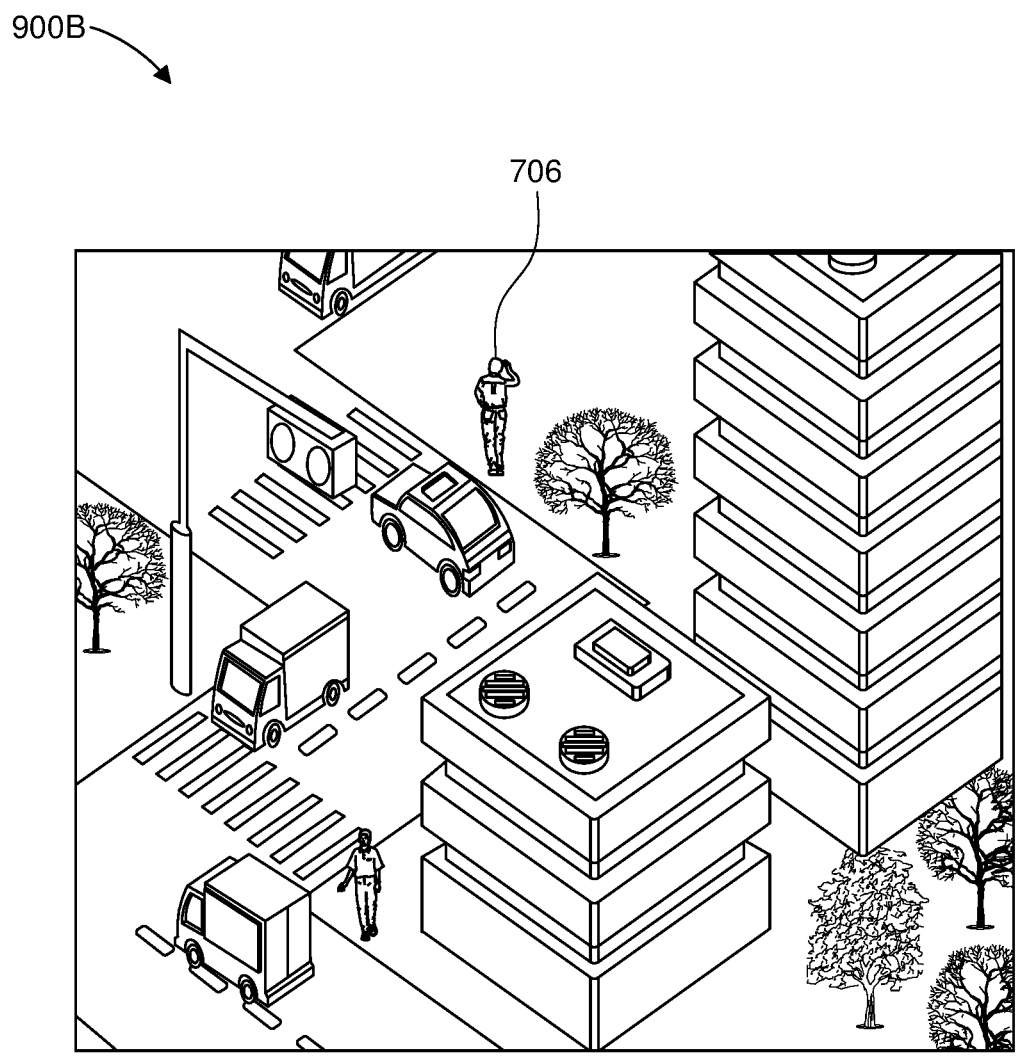

FIG. 9A and FIG. 9B are conceptual diagrams collectively illustrating an example user interface for modification of one or more features at the location in the XR environment.

FIG. 9A is a conceptual diagram illustrating an example user interface 800A for modification of one or more features at a location in the XR environment. The undoing the modification of the one or more features at the location, such as the location, may include altering a visual appearance of a virtual object at the location in the XR environment such that the virtual object is in a state corresponding to a previous state of the virtual object. The user interface 900A displays the first virtual avatar 706 and the virtual object, such as a tree 902, in the XR environment. The user can then supply commands for undoing creation or modification of the one or more features at the location. For example, the tree 902 was added in the XR environment by a second user at the location. Then the user in control of the first virtual avatar 706 visits the location and may want to remove the tree 902 from the location. The computing system may receive the input from the first virtual avatar 706 to remove the tree 902 from the location. The computing system performs the undoing (i.e., removal of the tree 902) at the location, thereby, reverting the state of the location to a previous state.

FIG. 9B is a conceptual diagram illustrating an example user interface 900B for modification of one or more features at a location in the XR environment. As can be seen in the user interface 900B, the computing system may remove the tree 902 from the location, based on the input received from the user controlling the first virtual avatar 706. Thus, in such a manner, the computing system may enable generation of the XR environment that may be personalized for each user. FIGS. 8-9 depict virtual avatars from a third person view for clarity, however, the wearer of an XR device controlling one of the virtual avatars may see the XR environment from the first-person view of that avatar.

Figure 10:
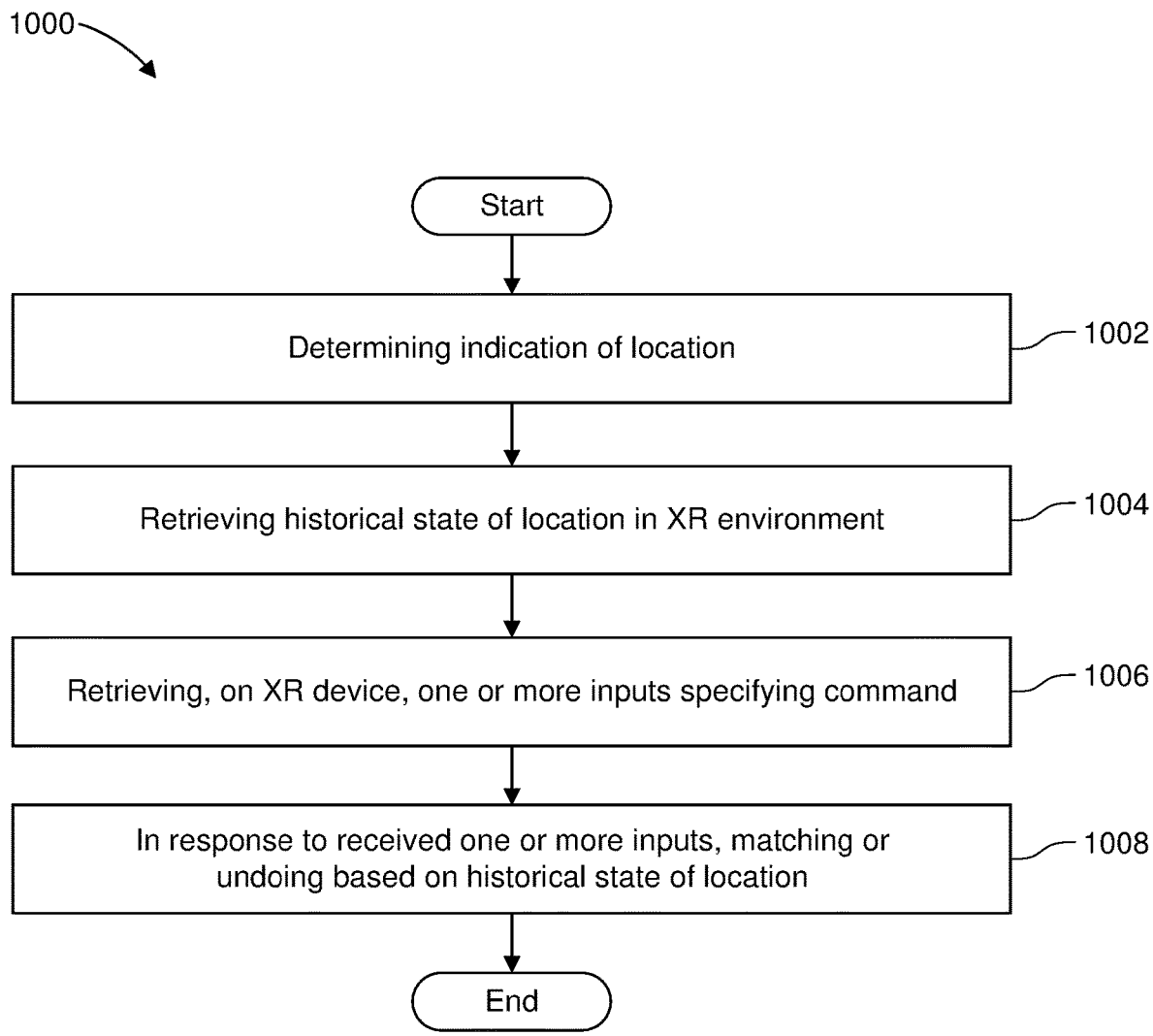
FIG. 10 is a flow diagram of a process used in some implementations for the location-based interaction in the XR environment.

FIG. 10 is a flow diagram of a process 1000 used in some implementations for location-based interaction in the XR environment. The steps identified in FIG. 10, and the order thereof, are exemplary and may include various alternatives, equivalents, or derivations thereof including but not limited to the order of execution of the same. The steps of the process of FIG. 10, and its various alternatives, may be embodied in hardware or software including a computer-readable storage medium (e.g., optical disc, memory card, or hard drive) including instructions executable by the processors 110 or the components 400. The process 1000 is at least partially performed on the one or more client computing devices 305A-D, or on the server computing devices 310 and 320, or both.

In an implementation, the process 1000 may be triggered when the computing system and the XR device are connected via the network 330. Once the XR device is activated by the user, the computing system may display the XR environment on the XR device and the virtual avatar of the user may be displayed at a location (such as the location where the virtual avatar is present) in the XR environment.

At block 1002, the indication of the location is determined in the XR environment. The location may be a place within the XR environment (area with defined border, event, building, restaurant, park, hospital, mall etc.). In one implementation, the indication of the location may be determined by an automatic system. In another implementation, user input is received to manually specify the indication of the location.

At block 1004, the historical state of the location is retrieved in the XR environment. In an example, the indication of the location is determined to be an educational institute. Then, the computing system may retrieve the historical state of the educational institute. For example, which virtual avatars existed at the educational institute in the past, virtual objects that exited at the educational institute, events that happened at the educational institute, etc. The historical state of the educational institute is retrieved using log of the virtual entities stored on the databases 315 and 325.

At block 1006, one or more inputs, specifying a command, are received on an XR device. The one or more inputs can be a touch input, an audio input, a text based input. The one or more inputs may be received either from user or the automatic system. The XR device may be an electronic device which is required for interaction of users with artificial world. The XR device may be at least one of a virtual reality device, an augmented reality device, or a mixed reality device. In one implementation, the one or more inputs can be related to retrieval of information of virtual entities that previously existed at the location. In some implementations, the inputs can specify a timeframe at which to view the entities that previously existed at the location. In another implementation, the one or more inputs can be related to filtering type of one or more virtual entities for a specific time frame. In another implementation, the one or more inputs can be related to undoing modification of one or more features at the location.

At block 1008 in response to received one or more inputs, matching one or more virtual entities to the location in the XR environment for the given timeframe or undoing the indicated modification of the one or more features at the location in the XR environment is performed based on the historical state of the location. The matching of the one or more virtual entities with a type that corresponds to a filter type location, is performed, for the given timeframe. The computing system retrieves all the indexes of the virtual entities that are indexed to that location. When a given time frame is provided by the user, the computing system finds all the virtual entities that are indexed to the location in the given timeframe. Further, the computing system matches the virtual entities from the historical state of location, based on the input filters provided by the user or the computing system. Undoing modification of the one or more features associated with the location may include undo of actions performed by a virtual avatar in the past, for example, altering a visual appearance of a location based on the preference of a virtual avatar. Further, the matched one or more entities may be displayed by displaying one or more user interface (UI) elements.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

Some example embodiments disclosed herein provide a computer implemented method for location-based interaction in an artificial reality (XR) environment. The computer implemented method comprises determining an indication of a location. The computer implemented method further comprises retrieving a historical state of the location in the XR environment. The computer implemented method further comprises receiving, on an XR device, one or more inputs specifying a command related to the historical state of the location. The command indicates either to retrieve information of virtual entities that previously existed at the location or to undo a modification of one or more features at the location. In response to the received one or more inputs, the computer implemented method further comprises matching, based on the historical state of the location, one or more virtual entities to the location in the XR environment for a given timeframe and displaying an indication of the matched one or more virtual entities. The computer implemented method further comprises undoing, based on the historical state of the location, the indicated modification of the one or more features at the location in the XR environment.

According to some example embodiments, the virtual entities comprise at least one of: one or more virtual avatars of one or more users that existed at the location, or one or more social events that occurred at the location.

According to some example embodiments, the command further indicates a filter type of one or more virtual entities, and the matching further comprises matching entities with a type that corresponds to the filter type.

According to some example embodiments, the computer implemented method further comprises validating that the matched one or more virtual entities corresponds to a given user indicated to have been at the location According to some example embodiments, the indication of the location is based on controlling user's avatar being at or proximate to the location. Further, the one or more inputs specifying the command are inputs from an automatic system indicating to retrieve information of virtual entities that previously existed at the location, corresponding to users with a specified relationship to the controlling user. Further, the displaying the indication of the matched one or more virtual entities comprises automatically generating notifications associated with the presence of the one or more virtual entities, corresponding to users with the specified relationship, at the location in the XR environment.

According to some example embodiments, the computer implemented method further comprises periodically filtering the historical state of the location, based on a determination that a storage time of a set of states of the historical state of the location is more than a predefined duration of time.

According to some example embodiments, the displaying comprises at least one of: replaying actions performed by the one or more virtual entities at the location, replaying a view of the location for the given timeframe, or replaying events engaged by the one or more virtual entities at the location.

According to some example embodiments, a format of the displaying the indication of the matched one or more virtual entities comprises at least one of: a two-dimensional (2D) image, a 2D virtual object, or a 2D video.

According to some example embodiments, the indication of the location is specified by a user input, and the one or more inputs are received, from a user of the XR device, and specify the given timeframe.

According to some example embodiments, the computer implemented method further comprises displaying a slider to select the given timeframe in the XR environment. Further, the one or more inputs specifying the given timeframe are received via the displayed slider.

According to some example embodiments, the undoing the modification of the one or more features at the location comprises altering a visual appearance of a virtual object at the location in the XR environment such that the virtual object is in a state corresponding to a previous state of the virtual object.

According to some example embodiments, the computer implemented method further comprises applying one or more computing devices to periodically track the virtual entities that previously existed at the location. The computer implemented method further comprises creating a log of the tracked virtual entities. The computer implemented method further comprises generating the historical state of the location based on the created log of the tracked virtual entities at the location.

According to some example embodiments, the computer implemented method further comprises indexing tracked virtual entities, to the location, to create the log of the tracked virtual entities. The computer implemented method further comprises storing the historical state of the location in a public ledger.

According to some example embodiments, the computer implemented method further comprises receiving, from the XR device, an input specifying a command to disable tracking presence of a user in historical states for the XR environment, for one or more timeframes.

Some example embodiments disclosed herein provide a computing system for location-based interaction in an artificial reality (XR) environment. The computing system comprises one or more processors and one or more memories storing instructions that, when executed by the one or more processors, cause the computing system to perform a process. The process comprises determining an indication of a location. The process further comprises retrieving a historical state of the location in the XR environment. The process further comprises receiving, on an XR device, one or more inputs specifying a command related to the historical state of the location. The command indicates either to retrieve information of virtual entities that previously existed at the location or to undo a modification of one or more features at the location. In response to the received one or more inputs, the process further comprises matching, based on the historical state of the location, one or more virtual entities to the location in the XR environment for a given timeframe and displaying an indication of the matched one or more virtual entities. The process further comprises undoing, based on the historical state of the location, the indicated modification of the one or more features at the location in the XR environment.

According to some example embodiments, the virtual entities comprise at least one of: one or more virtual avatars of one or more users that existed at the location, or one or more social events that occurred at the location.

According to some example embodiments, the command further indicates a filter type of one or more virtual entities, and the matching further comprises matching entities with a type that corresponds to the filter type.

Some example embodiments disclosed herein provide a computer-readable storage medium storing instructions that, when executed by a computing system, cause the computing system to perform a process for location-based interaction in an artificial reality (XR) environment. The process comprises determining an indication of a location. The process further comprises retrieving a historical state of the location in the XR environment. The process further comprises receiving, on an XR device, one or more inputs specifying a command related to the historical state of the location. The command indicates either to retrieve information of virtual entities that previously existed at the location or to undo a modification of one or more features at the location. In response to the received one or more inputs, the process further comprises matching, based on the historical state of the location, one or more virtual entities to the location in the XR environment for a given timeframe and displaying an indication of the matched one or more virtual entities. The process further comprises undoing, based on the historical state of the location, the indicated modification of the one or more features at the location in the XR environment.

I claim:

1. A computer implemented method for location-based interaction in an artificial reality (XR) environment, the computer implemented method comprising:
   determining an indication of a location;
   obtaining selection of a historical state, of multiple historical states associated with the location in the XR environment, wherein each of the multiple historical states corresponds to the location in the XR environment at a different particular time;
   retrieving the selected historical state of the location in the XR environment;
   receiving, via an XR device, one or more inputs specifying a command related to the selected historical state of the location, wherein the command indicates either to retrieve information of virtual entities that previously existed at the location or to undo a modification of one or more features at the location; and
   in response to the received one or more inputs:
      matching, based on the selected historical state of the location, one or more virtual entities to the location in the XR environment for a given timeframe and displaying an indication of the matched one or more virtual entities, or
      undoing, based on the selected historical state of the location, the indicated modification of the one or more features at the location in the XR environment.

2. The computer implemented method of claim 1, wherein the virtual entities comprise at least one of: one or more virtual avatars of one or more users that existed at the location or one or more social events that occurred at the location.

3. The computer implemented method of claim 2,
   wherein the command further indicates a filter type of the one or more virtual entities; and
   wherein the matching further comprises matching entities with a type that corresponds to the filter type.

4. The computer implemented method of claim 1, further comprising validating that the matched one or more virtual entities correspond to a given user indicated to have been at the location.

5. The computer implemented method of claim 1,
   wherein the indication of the location is based on a controlling user's avatar being at or proximate to the location;
   wherein the one or more inputs specifying the command are inputs from an automatic system indicating to retrieve information of virtual entities, that previously existed at the location, corresponding to users with a specified relationship to the controlling user; and
   wherein the displaying the indication of the matched one or more virtual entities comprises automatically generating notifications associated with the presence of the one or more virtual entities, corresponding to users with the specified relationship, at the location in the XR environment.

6. The computer implemented method of claim 1, further comprising periodically condensing the multiple historical states of the location, based on a determination that a storage time of a set of entries corresponding to the multiple historical states of the location is more than a predefined duration of time.

7. The computer implemented method of claim 1, wherein the displaying comprises at least one of: replaying actions performed by the one or more virtual entities at the location, replaying a view of the location for the given timeframe, or replaying events engaged in by the one or more virtual entities at the location.

8. The computer implemented method of claim 1, wherein a format of the displaying the indication of the matched one or more virtual entities comprises at least one of: a two-dimensional (2D) image, a 2D virtual object, or a 2D video.

9. The computer implemented method of claim 1,
   wherein the indication of the location is specified by a user input; and
   wherein the one or more inputs are received, from a user of the XR device, and specify the given timeframe.

10. The computer implemented method of claim 9, further comprising:
    displaying a slider to select the given timeframe in the XR environment;
    wherein the one or more inputs specifying the given timeframe are received via the displayed slider.

11. The computer implemented method of claim 1, wherein the undoing the modification of the one or more features at the location comprises altering a visual appearance of a virtual object at the location in the XR environment such that the virtual object is in a state corresponding to a previous state of the virtual object.

12. The computer implemented method of claim 1, further comprising:

applying one or more computing devices to periodically track the virtual entities that previously existed at the location;

creating a log of the tracked virtual entities; and generating the multiple historical states of the location based on the created log of the tracked virtual entities at the location.

13. The computer implemented method of claim 12, further comprising indexing tracked virtual entities, to the location, to create the log of the tracked virtual entities.

14. The computer implemented method of claim 1, further comprising storing the multiple historical states of the location in a blockchain ledger.

15. The computer implemented method of claim 1, further comprising receiving, from the XR device, an input specifying a command to disable tracking presence of a user in historical states for the XR environment, for one or more timeframes.

16. A computing system for location-based interaction in an artificial reality (XR) environment, the computing system comprising:

one or more processors; and one or more memories storing instructions that, when executed by the one or more processors, cause the computing system to perform a process comprising:

determining an indication of a location;

obtaining selection of a historical state, of multiple historical states associated with the location in the XR environment, wherein each of the multiple historical states corresponds to the location in the XR environment at a different particular time;

retrieving the selected historical state of the location in the XR environment;

receiving, via an XR device, one or more inputs specifying a command related to the selected historical state of the location, wherein the command indicates either to retrieve information of virtual entities that previously existed at the location or to undo a modification of one or more features at the location; and in response to the received one or more inputs:

matching, based on the selected historical state of the location, one or more virtual entities to the location in the XR environment for a given timeframe and displaying an indication of the matched one or more virtual entities, or undoing, based on the selected historical state of the location, the indicated modification of the one or more features at the location in the XR environment.

17. The computing system of claim 16, wherein the virtual entities comprise at least one of: one or more virtual avatars of one or more users that existed at the location, or one or more social events that occurred at the location.

18. The computing system of claim 17, wherein the command further indicates a filter type of one or more virtual entities; and wherein the matching further comprises matching entities with a type that corresponds to the filter type.

19. The computing system of claim 16, further comprising validating that the matched one or more virtual entities corresponds to a given user indicated to have been at the location.

20. A computer-readable storage medium storing instructions that, when executed by a computing system, cause the computing system to perform a process for location-based interaction in an artificial reality (XR) environment, the process comprising:

determining an indication of a location;

obtaining selection of a historical state, of multiple historical states associated with the location in the XR environment, wherein each of the multiple historical states corresponds to the location in the XR environment at a different particular time;

retrieving the selected historical state of the location in the XR environment;

receiving, via an XR device, one or more inputs specifying a command related to the selected historical state of the location, wherein the command indicates either to retrieve information of virtual entities that previously existed at the location or to undo a modification of one or more features at the location; and in response to the received one or more inputs:

matching, based on the selected historical state of the location, one or more virtual entities to the location in the XR environment for a given timeframe and displaying an indication of the matched one or more virtual entities, or undoing, based on the selected historical state of the location, the indicated modification of the one or more features at the location in the XR environment.

* * * * *